United States Patent
Kubota et al.

(10) Patent No.: US 9,904,130 B2
(45) Date of Patent: Feb. 27, 2018

(54) CONNECTING WIRE

(71) Applicant: SHARP KABUSHIKI KAISHA, Sakai, Osaka (JP)

(72) Inventors: Tomofumi Kubota, Sakai (JP); Kazushige Miyamoto, Sakai (JP); Yasuhiro Mimura, Sakai (JP); Yasuhiro Nakatake, Sakai (JP); Kazuya Nakajima, Sakai (JP)

(73) Assignee: SHARP KABUSHIKI KAISHA, Sakai, Osaka (JP)

( * ) Notice: Subject to any disclaimer, the term of this patent is extended or adjusted under 35 U.S.C. 154(b) by 0 days.

(21) Appl. No.: 15/312,016

(22) PCT Filed: Feb. 27, 2015

(86) PCT No.: PCT/JP2015/055760
§ 371 (c)(1),
(2) Date: Nov. 17, 2016

(87) PCT Pub. No.: WO2015/178059
PCT Pub. Date: Nov. 26, 2015

(65) Prior Publication Data
US 2017/0097529 A1 Apr. 6, 2017

(30) Foreign Application Priority Data
May 22, 2014 (JP) ................................. 2014-106565

(51) Int. Cl.
*G02F 1/1345* (2006.01)
*G02F 1/1333* (2006.01)
*G02F 1/137* (2006.01)

(52) U.S. Cl.
CPC ........ *G02F 1/13452* (2013.01); *G02F 1/1345* (2013.01); *G02F 1/13458* (2013.01);
(Continued)

(58) Field of Classification Search
CPC ............... G02F 1/1345; G02F 1/13452; G02F 1/13458; G02F 1/133345; G02F 2001/13775
See application file for complete search history.

(56) References Cited

U.S. PATENT DOCUMENTS 7,119,801 B1 * 10/2006 Endo .................... G02F 1/13452
345/204

FOREIGN PATENT DOCUMENTS

JP 11-24101 1/1999

OTHER PUBLICATIONS

International Search Report for PCT/JP2015/055760 dated May 19, 2015, 4 pages.
(Continued)

*Primary Examiner* — Dung Nguyen
(74) *Attorney, Agent, or Firm* — ScienBiziP, P.C.

(57) ABSTRACT

There are provided connecting wires whose reliability may be ensured by preventing leakage between the connecting wires and by preventing entry of moisture. Overexposure is performed by using a mask having a shape of a protruding pattern (55a) with a sharp tip end at a position corresponding to a pattern edge of an organic insulating film (70) between adjacent connecting wires (50). Inclination of an inclined surface of the organic insulating film (70) sandwiched by the connecting wires (50) is thereby made gradual, and thus, at the time of forming the connecting wires (50), a film thickness of a resist may be prevented from becoming thick along an edge line of the organic insulating film (70). As a result, the resist is prevented from remaining in a connected manner at a region sandwiched by the adjacent connecting wires (50), and leakage between the adjacent connecting wires (50) may be prevented.

14 Claims, 25 Drawing Sheets

(52) U.S. Cl.
CPC ........ *G02F 1/133345* (2013.01); *G02F 1/137* (2013.01); *G02F 2001/13775* (2013.01); *G02F 2201/121* (2013.01); *G02F 2201/123* (2013.01)

(56) References Cited

OTHER PUBLICATIONS

Written Opinion of the ISA for PCT/JP2015/055760 dated May 19, 2015, 3 pages.

* cited by examiner (A)

(B)

(C)

(A)

(B)

(C)

(A)

(B)

(C)

(A)

(B)

WITH REMAINING ITO FILM

WITHOUT REMAINING ITO FILM (A) W1-W1 CROSS SECTION (B) W2-W2 CROSS SECTION (C) W3-W3 CROSS SECTION (D) L-L CROSS SECTION (A)

(B)

(A)

(B)

CONNECTING WIRE

This application is the U.S. national phase of International Application No. PCT/JP2015/055760 filed Feb. 27, 2015 which designated the U.S. and claims priority to JP Patent Application No. 2014-106565 filed May 22, 2014, the entire contents of each of which are hereby incorporated by reference.

TECHNICAL FIELD

The present invention relates to a connecting wire, and more particularly, to a connecting wire used to input a testing signal and the like for a liquid crystal panel from outside before the liquid crystal panel is cut out from a mother glass substrate.

BACKGROUND ART

Conventionally, with a liquid crystal panel of a liquid crystal display device of a lateral electric field method, to prevent signals applied to a scanning signal line and a data signal line of a display region from becoming blunt due to parasitic capacitance, a thick organic insulating film is formed on the scanning signal line and the data signal line, and a common electrode is formed thereon. The parasitic capacitance between the scanning and data signal lines and the common electrode is thereby reduced, and bluntness of signals may be reduced.

However, when forming, as a mask, a resist pattern on a conductive film formed on the organic insulating film, and forming a wiring layer by etching the mask, the resist becomes thick along the edge line of the organic insulating film because the thick organic insulating film, and resist which is supposed to be removed at the time of development tends to remain in a connected manner. The resist remaining along the edge line becomes a mask covering a part of the conductive film at the time of etching the conductive film, and thus, the conductive film is made to remain, in a connected manner, along the edge line. Connecting wires that are adjacent to each other across the remaining conductive film are electrically connected, thereby resulting in a problem of leakage between the connecting wires.

Accordingly, Patent Document 1 discloses, on an array substrate constituting a liquid crystal panel, providing a protruding portion at an end portion, of an inter-layer insulating film with a large thickness, at a region sandwiched by adjacent mounting terminals so as to make the inclination of the end portion of the inter-layer insulating film gradual, before patterning a pixel electrode material formed on the inter-layer insulating film to form wires. The inclination of the inter-layer insulating film is thereby made gradual. As a result, the thickness of the resist formed on the protruding portion of the inter-layer insulating film is reduced, and the resist is prevented from remaining in a connected manner after development. Therefore, adjacent mounting terminals are not electrically connected, and no leakage is caused between the mounting terminals.

PRIOR ART DOCUMENT

Patent Document

[Patent Document 1] Japanese Patent Application Laid-Open No. 11-24101

SUMMARY OF THE INVENTION

Problems to be Solved by the Invention

However, according to the array substrate disclosed in Patent Document 1, the edge portion of the organic insulating film used as the inter-layer insulating film is not covered with an inorganic insulating film. Accordingly, moisture in the air enters the inside of a wire through the organic insulating film, and corrodes a metal film constituting the wire or causes an inorganic insulating film to be easily delaminated. This results in a problem of reduced reliability of the wire. Also, if the moisture enters the inside of a liquid crystal panel, wires of a scanning signal line drive circuit are corroded, thereby resulting in display unevenness.

Accordingly, the present invention has its object to provide a connecting wire whose reliability may be ensured by preventing leakage between connecting wires and by preventing entry of moisture.

Means for Solving the Problems

A first aspect of the present invention is directed to a plurality of connecting wires configured to connect, at a transparent substrate where a plurality of cells is formed, wires provided respectively to the plurality of cells and common wires formed at a region of the transparent substrate where the cells are not formed, each cell being a display device configured to display an image in a display portion based on image data supplied from outside after division, wherein the connecting wire is formed to cross, at the cell, a step portion formed from a conductive layer disposed outside the display portion, a first inorganic insulating film formed on the conductive layer, an organic insulating film formed on the first inorganic insulating film, and a second inorganic insulating film formed on the organic insulating film, and an inclination of an inclined surface of the organic insulating film at a region sandwiched by the connecting wires that are adjacent to each other is more gradual than inclinations of inclined surfaces at the connecting wires.

According to a second aspect of the present invention, in the first aspect of the present invention, wherein at least one protruding portion is formed from the inclined surface of the organic insulating film at the region sandwiched by the adjacent connecting wires toward an edge portion of the second inorganic insulating film, the protruding portion has a shape whose width and thickness are reduced toward a tip end, and the organic insulating film including the protruding portion is covered with the second inorganic insulating film.

According to a third aspect of the present invention, in the second aspect of the present invention, wherein the organic insulating film includes a photosensitive resin, and the protruding portion is formed by performing exposure for a period of time that is longer than a proper period of time by using a mask including a protruding pattern.

According to a fourth aspect of the present invention, in the first aspect of the present invention, wherein each of the connecting wires includes a first connecting wire including transparent conductive film.

According to a fifth aspect of the present invention, in the fourth aspect of the present invention, wherein each of the connecting wires further includes a second connecting wire including a transparent conductive film formed between the first connecting wire and the organic insulating film, a width of the second connecting wire is narrower than a width of the first connecting wire, and the first connecting wire and the second connecting wire are electrically connected at a contact region provided to the step portion.

According to a sixth aspect of the present invention, in the fifth aspect of the present invention, wherein a third connecting wire of a metal having a resistance lower than that of the second connecting wire is formed on one of an upper surface and a lower surface of the second connecting wire, along a length direction of the second connecting wire.

According to a seventh aspect of the present invention, in the sixth aspect of the present invention, wherein a metal film forming the third connecting wire is one of copper, molybdenum, aluminum, an alloy thereof, and a laminated film of aluminum and molybdenum.

According to an eighth aspect of the present invention, in the first aspect of the present invention, wherein an intermediate region having a flat surface that is substantially parallel to a surface of the transparent substrate is formed on an inclined surface, at a position lower than an upper surface of the step portion, of the organic insulating film at the region sandwiched by the adjacent connecting wires.

According to a ninth aspect of the present invention, in the eighth aspect of the present invention, wherein the intermediate region is formed by performing exposure and development using a mask including a half-tone portion whose film thickness is adjusted to realize transmittance in a range between that of a light blocking portion configured not to transmit light and that of an opening portion configured to directly transmit light.

According to a tenth aspect of the present invention, in the eighth aspect of the present invention, wherein the intermediate region is formed by performing exposure and development using a mask including a gray tone portion that is a light blocking film with a plurality of slits.

According to an eleventh aspect of the present invention, in the second aspect of the present invention, wherein the protruding portion or the intermediate region formed at the region sandwiched by the adjacent connecting wires is also formed at a region where the cell is not formed.

According to a twelfth aspect of the present invention, in the first aspect of the present invention, wherein, to test at least one of disconnection and short-circuit of a scanning signal line or a data signal line formed at the display portion, the connecting wires supply testing signals input from the common wires to testing wires connected to the scanning signal lines and the data signal lines of the plurality of cells formed on the transparent substrate.

According to a thirteenth aspect of the present invention, in the first aspect of the present invention, wherein the display device is a liquid crystal display device configured to display an image by applying voltage to a liquid crystal layer sandwiched, at the display portion, by a pixel electrode and a common electrode and by controlling light transmittance, and when polymerizing photopolymerizable monomer or oligomer mixed in advance in the liquid crystal layer and forming an alignment sustaining layer configured to control an alignment direction of liquid crystal molecules included in the liquid crystal layer while voltage is not applied, each of the connecting wires of the plurality of cells formed on the transparent substrate inputs a signal necessary for forming the alignment sustaining layer to the pixel electrode through a data signal line connected to the pixel electrode, and applies voltage to the liquid crystal layer between the pixel electrode and the common electrode.

According to a fourteenth aspect of the present invention, in the thirteenth aspect of the present invention, wherein the liquid crystal display device further includes an auxiliary capacitance wire configured to form auxiliary capacitance with the pixel electrode, and when polymerizing photopolymerizable monomer or oligomer mixed in advance in the liquid crystal layer and forming the alignment sustaining layer, each of the connecting wires of the plurality of cells formed on the transparent substrate inputs a signal necessary for forming the alignment sustaining layer to the pixel electrode through the auxiliary capacitance wire, and applies voltage to the liquid crystal layer between the pixel electrode and the common electrode.

Effects of the Invention

According to the first aspect described above, the inclination of the inclined surface of the organic insulating film at the region sandwiched by adjacent connecting wires is more gradual than the inclination of the inclined surface of the organic insulating film at the connecting wires. Accordingly, the film thickness of a resist applied for patterning the connecting wires does not become thick along the edge line of the organic insulating film at the region between the connecting wires, and the resist is less likely to remain in a connected manner between the adjacent connecting wires. Therefore, short-circuit due to electrical connection between the adjacent connecting wires is less likely to occur. Also, an end portion of the organic insulating film is covered with the second inorganic insulating film, and thus, moisture in the air does not enter from the end portion of the organic insulating film to reduce reliability of the wires.

According to the second aspect described above, at least one protruding portion is formed at the region sandwiched by the adjacent connecting wires, from the inclined surface of the organic insulating film toward the edge portion of the second inorganic insulating film. This makes the inclination of the inclined surface of the organic insulating film at the region between the connecting wires more gradual, to the extent of the protruding portion, than the inclination of the inclined surface of the organic insulating film at the connecting wires. This makes short-circuit due to electrical connection between the adjacent connecting wires be less likely to occur. Also, because the end portion of the organic insulating film, including the tip end of the protruding portion, is covered with the second inorganic insulating film, moisture in the air does not enter from the end portion of the organic insulating film to reduce reliability of the wires.

According to the third aspect described above, the organic insulating film is formed of a photosensitive resin, and thus, by using a mask including a protruding pattern and adjusting the exposure time, the inclined surface of the organic insulating film may be easily made gradual.

According to the fourth aspect described above, the connecting wire has a simple structure that is formed from the first connecting wire, and thus, short-circuit between the connecting wires may be easily prevented.

According to the fifth aspect described above, the second connecting wire that is electrically connected to the first connecting wire at the contact region is formed between the first connecting wire and the organic insulating film. This allows the resistance of the connecting wire to be reduced, and also, redundancy may be achieved to allow the connecting wire to function as long as one is connected even through the other is disconnected. Furthermore, by making the width of the second connecting wire narrower than the width of the first connecting wire, the possibility of short-circuit between the second connecting wires is reduced, and the possibility of short-circuit is reduced for the connecting wires including the first connecting wires and the second connecting wires.

According to the sixth aspect described above, by further providing the third connecting wire formed of a metal having a resistance lower than that of the second connecting wire, the resistance value of the connecting wire may be made small. Also, the width of the connecting wire may be reduced. In the case where the width of the connecting wire is reduced, the width of the region sandwiched by the connecting wires is increased, allowing a greater number of protruding portions to be formed. Accordingly, short-circuit between the connecting wires may be more reliably prevented.

According to the seventh aspect described above, by forming the third connecting wire with one of copper, molybdenum, aluminum, an alloy thereof, and a laminated film of aluminum and molybdenum, the resistance value of the connecting wire may be reduced.

According to the eighth aspect described above, the intermediate region having a flat surface that is substantially parallel to a surface of the transparent substrate is formed on the inclined surface of the organic insulating film at the region sandwiched by the adjacent connecting wires. This makes the inclination of the inclined surface of the organic insulating film at the region between the connecting wires be more gradual, to the extent of the intermediate region, than the inclination of the inclined surface of the organic insulating film at the connecting wires. This makes short-circuit due to electrical connection between the adjacent connecting wires be less likely to occur. Also, because the end portion of the organic insulating film is covered with the second inorganic insulating film, moisture in the air does not enter from the end portion of the organic insulating film to reduce reliability of the wires.

According to the ninth aspect described above, by performing exposure and development using the mask including the half-tone portion, the intermediate region may be easily formed on the organic insulating film.

According to the tenth aspect described above, by performing exposure and development using the mask including the gray tone portion, the intermediate region may be easily formed on the organic insulating film.

According to the eleventh aspect described above, the protruding portion or the intermediate region formed at the region sandwiched by the adjacent connecting wires is also formed at a region of the transparent substrate where the cell is not formed. This makes short-circuit due to electrical connection between the adjacent connecting wires be even less likely to occur. Also, because the end portion of the organic insulating film is covered with the second inorganic insulating film, moisture in the air does not enter from the end portion of the organic insulating film, and reliability of the wires is even less likely to be reduced.

According to the twelfth aspect described above, a testing signal is supplied to the testing wires through the common wires formed at the region of the transparent substrate where the cells are not formed. This allows testing to be performed simultaneously with respect to whether disconnection or short-circuit has occurred to the scanning signal lines and the data signal lines of a plurality of cells, and thus, presence/absence of disconnection or short-circuit may be checked in a short time.

According to the thirteenth aspect described above, when polymerizing photopolymerizable monomer or oligomer mixed in advance in the liquid crystal layer and forming an alignment sustaining layer configured to control an alignment direction of liquid crystal molecules included in the liquid crystal layer when voltage is not applied, voltage is applied to the liquid crystal layer between the data signal line connected to the pixel electrode and the common electrode. At this time, the voltage to be applied to the pixel electrode and the common electrode is supplied, at the same time, to a plurality of cells from the common wires through the connecting wires, and thus, the alignment sustaining layers may be formed in a short time.

According to the fourteenth aspect described above, when forming the alignment sustaining layer, voltage is applied to the liquid crystal layer between the pixel electrode and the common electrode through the auxiliary capacitance wire. At this time, the voltage to be applied to the auxiliary capacitance wire and the common electrode is supplied, at the same time, to a plurality of cells from the common wires through the connecting wires, and the alignment sustaining layers may be formed in a short time.

BRIEF DESCRIPTION OF THE DRAWINGS

FIG. 5(A) is a cross-sectional view showing the shape of a cross section of the region sandwiched by the connecting wires, along arrow A1-A1, FIG. 5(B) is a cross-sectional view showing the shape of a cross section of an end portion of the connecting wire, along arrow A2-A2 and in the length direction, and FIG. 5(C) is a cross-sectional view showing the shape of a cross section of a center portion of the connecting wire, along arrow A3-A3 and in the length direction.

FIG. 6(A) is a cross-sectional view showing a state after a resist is applied to form an upper-layer connecting wire by patterning an ITO film at a region between the connecting wires, FIG. 6(B) is a cross-sectional view showing the resist remaining along an edge line of an organic insulating film at the time of patterning, and FIG. 6(C) is a cross-sectional view showing an etching residue of the ITO film between the connecting wires.

FIG. 8(A) is a cross-sectional view showing the shape of a cross section of the region sandwiched by the connecting wires, along arrow B1-B1, FIG. 8(B) is a cross-sectional view showing the shape of a cross section of an end portion of the connecting wire, along arrow B2-B2 and in the length direction, and FIG. 8(C) is a cross-sectional view showing the shape of a cross section of a center portion of the connecting wire, along arrow B3-B3 and in the length direction.

FIG. 11(A) is a diagram showing the shape of an organic insulating film before a second inorganic insulating film is formed, and FIG. 11(B) is a diagram showing the shape of the organic insulating film after the second inorganic insulating film is formed.

FIG. 17(A) is a cross-sectional view showing the shape of a transverse cross-section of the protruding portion along arrow W1-W1 shown in FIG. 16, FIG. 17(B) is a cross-sectional view showing the shape of a transverse cross-section of the protruding portion along arrow W2-W2 shown in FIG. 16, FIG. 17(C) is a cross-sectional view showing the shape of a transverse cross-section of the protruding portion along arrow W3-W3 shown in FIG. 16, and FIG. 17(D) is a cross-sectional view showing the shape of a longitudinal cross-section along arrow L-L shown in FIG. 16.

FIG. 22(A) is a plan view showing an intermediate region formed on an inclined surface of an organic insulating film, and FIG. 22(B) is a plan view showing the intermediate region after a second inorganic insulating film is formed.

FIG. 27(A) is a cross-sectional view of the CPA mode liquid crystal panel before photopolymerization, and FIG. 27(B) is a cross-sectional view of the CPA mode liquid crystal panel after photopolymerization.

MODES FOR CARRYING OUT THE INVENTION

Before describing each embodiment of the present invention, a basic configuration which is common to all embodiments (hereinafter "basic configuration") will be described.

0. Basic Configuration 0.1 Overall Configuration

Figure 1:
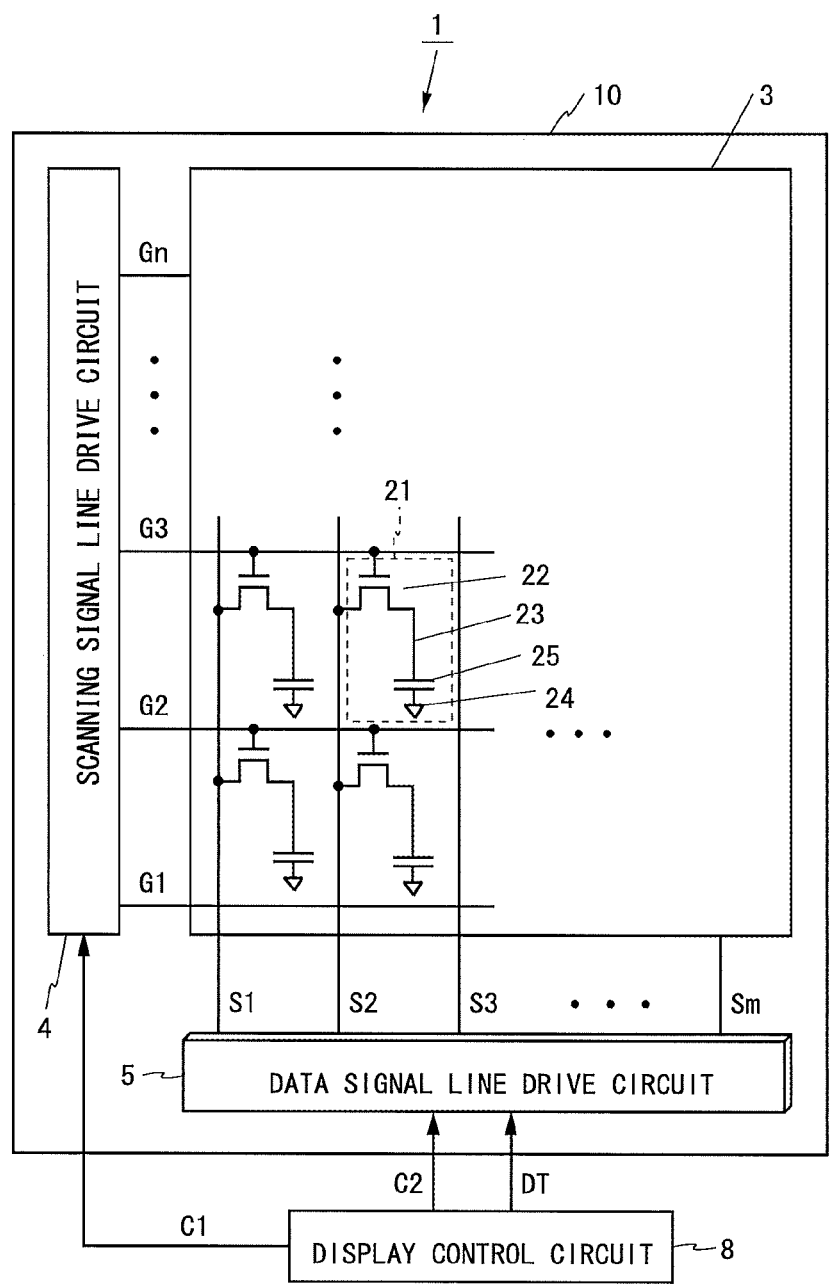
FIG. 1 is a block diagram showing a configuration of a liquid crystal display device.

FIG. 1 is a block diagram showing a configuration of a liquid crystal display device 1. The liquid crystal display device 1 shown in FIG. 1 is an active matrix-type display device including a display portion 3, a display control circuit 8, a scanning signal line drive circuit 4, and a data signal line drive circuit 5.

The display portion 3 includes n scanning signal lines G1 to Gn, m data signal lines S1 to Sm, and (n×m) pixel formation portions 21. The scanning signal lines G1 to Gn are arranged in parallel to one another, and the data signal lines S1 to Sm are arranged in parallel to one another while being orthogonal to the scanning signal lines G1 to Gn. The pixel formation portion 21 is arranged near an intersection of the scanning signal line Gi and the data signal line Sj. In this manner, the (n×m) pixel formation portions 21 are arranged two-dimensionally, with m pieces in each row and n pieces in each column.

The display control circuit 8 outputs, based on a control signal and image data supplied from outside, a control signal C1 to the scanning signal line drive circuit 4 and a control signal C2 and image data DT to the data signal line drive circuit 5. The scanning signal line drive circuit 4 selects the scanning signal lines G1 to Gn based on the control signal C1, sequentially and one by one. The data signal line drive circuit 5 applies a voltage according to the image data DT to the data signal lines S1 to Sm based on the control signal C2 and the image data DT. The voltage according to the image data DT is thereby written to the pixel formation portions 21 of one selected row. The liquid crystal display device 1 displays an image in this manner.

Each pixel formation portion 21 includes a thin film transistor 22 ("TFT 22") that functions as a switching element, a pixel electrode 23 connected to a drain electrode of the TFT 22, and a common electrode 24 that forms a liquid crystal capacitance 25 together with the pixel electrode 23 and that is commonly provided to each pixel formation portion 21. Each liquid crystal capacitance 25 holds a liquid crystal layer (not shown) between the pixel electrode 23 and the common electrode 24.

Figure 2:
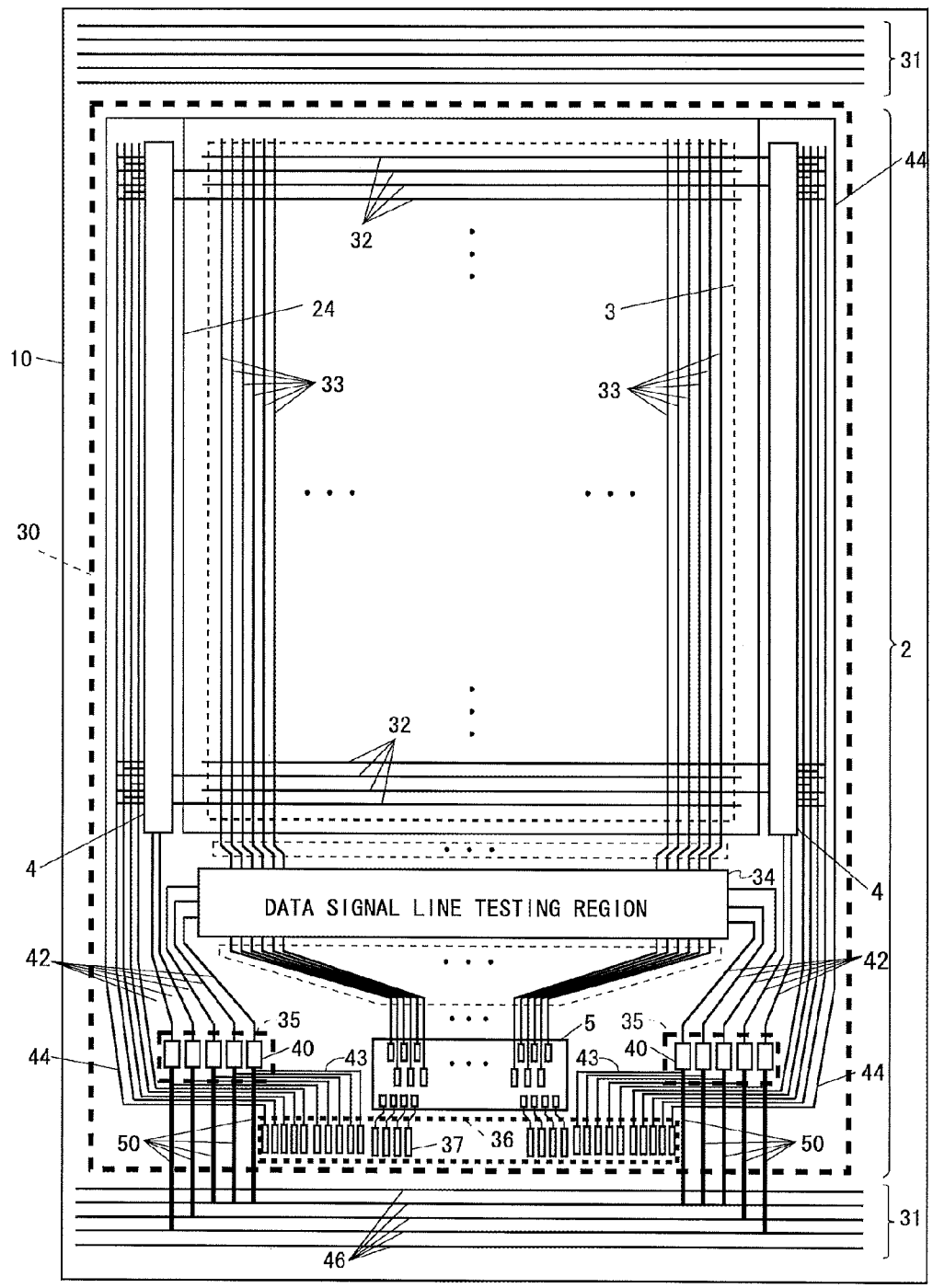
FIG. 2 is a diagram showing a configuration of a cell before it is divided and cut out from a mother glass substrate.

FIG. 2 is a diagram showing a configuration of a cell 2 before it is divided and cut out from a mother glass substrate 10. Although a plurality of cells 2 is formed on the mother glass substrate 10, FIG. 2 focuses on one of the cells 2 to show its configuration. The cell 2 refers, herein, to a liquid crystal panel in a state where an array substrate and a counter substrate formed on the mother glass substrate 10 are bonded together before the liquid crystal panel is cut out from the mother glass substrate 10. The display portion 3 configured to display images, characters and the like is provided at a center portion of the cell 2. A plurality of scanning signal lines 32 formed in a horizontal direction, a plurality of data signal lines 33 formed in a vertical direction, and pixel formation portions (not shown) formed at the intersections are formed at the display portion 3.

The scanning signal line drive circuit 4 configured to drive the scanning signal lines 32, and the data signal line drive circuit 5 configured to drive the data signal lines 33 are provided in the peripheral region of the display portion 3. The scanning signal line drive circuit 4 and the data signal line drive circuit 5 may be formed monolithically with the display portion 3, or semiconductor chips having the functions may be mounted on the mother glass substrate 10. In FIG. 2, two scanning signal line drive circuits 4 which are formed monolithically with the display portion 3 are arranged at left and right peripheral regions of the display portion 3, and the scanning signal line drive circuits 4 respectively activate odd-numbered scanning signal lines 32 and even-numbered scanning signal lines 32 in turn. Also, the data signal line drive circuit 5 is mounted on the mother glass substrate 10 as a semiconductor chip, and applies a voltage according to the image data DT to each data signal line 33. The image data DT, and the control signals C1, C2 are supplied to the scanning signal line drive circuits 4 and the data signal line drive circuit 5 through respective flexible printed circuit (FPC) terminals 37 provided at an FPC portion 36 provided on the array substrate of the cell 2. Also, although a data signal line testing region 34 where a testing circuit (not shown) for the data signal lines 33 is formed is arranged between the data signal line drive circuit 5 and the data signal lines 33, description thereof is not included herein because the data signal line testing region 34 is not directly relevant to the present invention.

Testing terminal portions 35, each including a plurality of testing terminals 40, are arranged near the left and right of the data signal line drive circuit 5 in a manner sandwiching the data signal line drive circuit 5. A testing wire 42 connected to the scanning signal line 32 or the data signal line 33, a connecting wire 50 connected to a common testing wire 46 formed at a waste substrate region 31 to be described later, and an input wire 43 configured to input a signal from each FPC terminal 37 are connected to each testing terminal 40. Note that the common testing wire 46 may sometimes be referred to as a "common wire".

The waste substrate region 31 to be cut at the time of dividing cells into individual cells 2 along division lines 30 is provided between adjacent cells 2 on the mother glass substrate. A plurality of common testing wires 46 is formed at the waste substrate region 31, and a testing signal is supplied to the common testing wire 46 from outside. Accordingly, by connecting the common testing wire 46 to a wire to be tested, in each array substrate, through the connecting wire 50, wires of a plurality of cells 2 may be tested at the same time in the state of the mother glass substrate or in a state during division from the mother glass substrate into each liquid crystal panel. Additionally, because the waste substrate region 31 of the mother glass substrate 10 is cut along the division line 30 when testing of each cell 2 is complete and division is performed, the waste substrate region 31 and the common testing wires 46 do not remain in a separated liquid crystal panel.

Moreover, the common electrode 24 is formed to cover the display portion 3, and common signal wires 44 extending along left and right end portions of each cell 2 from the FPC terminals 37 are connected to left and right upper ends of the common electrode 24. Accordingly, when a common voltage is supplied from outside through the FPC terminal 37, the common voltage is applied to the common electrode 24.

Figure 3:
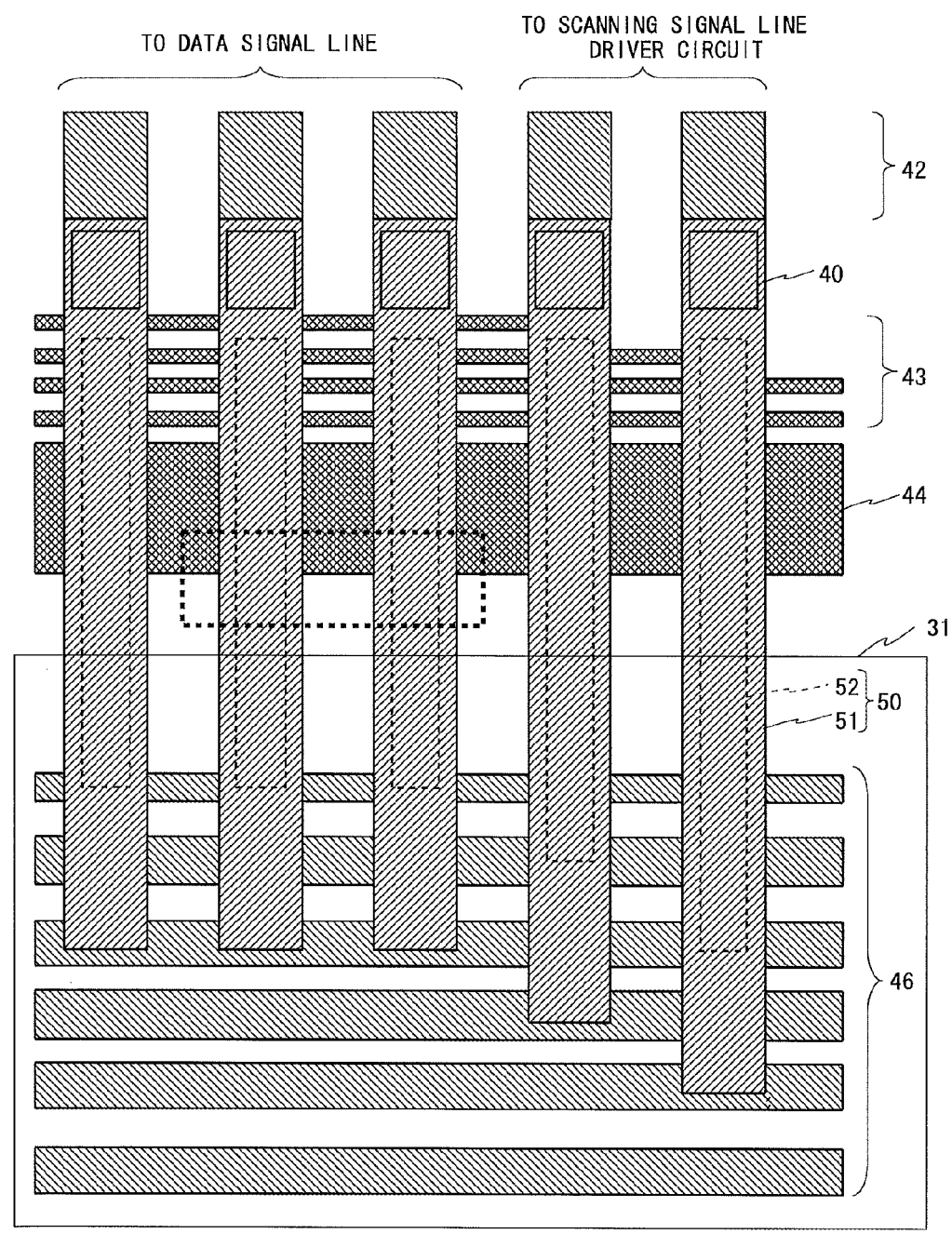
FIG. 3 is a plan view showing arrangement of connecting wires that are formed on an array substrate of the cell shown in FIG. 2 and are configured to connect testing wires and common testing wires through testing terminals.

FIG. 3 is a plan view showing arrangement of the connecting wires 50 that are formed on the array substrate of the cell 2 and are configured to connect the testing wires 42 and the common testing wires 46 through the testing terminals 40. As shown in FIG. 3, five testing terminals 40 are arranged in a horizontal direction. Of the five testing terminals 40, the three testing terminals 40 on the left are terminals that are connected to the testing wires 42 for testing the data signal lines 33, and are connected to the data signal lines 33 through the testing wires 42 and a testing circuit formed at the data signal line testing region 34, and are also connected to the common testing wires 46 through the connecting wires 50. The two testing terminals 40 on the right are terminals for testing the scanning signal lines 32, and are connected to the scanning signal line drive circuit 4 through the testing wires 42, and are also connected, through the connecting wires 50, to the common testing wires 46 different from the wires for testing the data signal lines 33. Furthermore, each testing terminal 40 is also connected to the FPC terminal 37 through the input wire 43. Accordingly, a control signal for driving the liquid crystal panel or a testing signal for testing the liquid crystal panel is supplied to the scanning signal line 32 and the data signal line 33. Note that, although testing terminals 40 other than those described above are also provided, they are not included in the drawings and the description.

Furthermore, the common signal wire 44 with a wide width is formed adjacent to the input wire 43 extending from a lower end of each testing terminal 40 to the FPC terminal 37. The common signal wire 44 is a wire for applying a common voltage to the common electrode 24 formed at the pixel formation portion. The connecting wire 50 traverses above the input wires 43 and the common signal wire 44, and connects the testing terminal 40 of each array substrate and the common testing wire 46 arranged at the waste substrate region 31.

0.2 Configuration of Connecting Wire

The name of each layer used in describing the configuration of the connecting wire 50 will be described. Each layer constituting the connecting wire 50 uses an insulating film and a conductive film that are formed at the time of forming the TFT 22 of the pixel formation portion 21. Accordingly, in the following description about the configuration of the connecting wire 50, a conductive layer formed at the same time as a gate electrode of the TFT 22 and the scanning signal line 32 will be referred to as a "gate metal layer 61", an insulating layer formed at the same time as a gate insulating film of the TFT 22 as a "gate insulating layer 62", an insulating layer formed at the same time as a channel etch stopper layer of the TFT 22 as a "channel etch stopper layer 63", a conductive layer formed at the same time as source electrode/drain electrode of the TFT 22 and the data signal line 33 as a "source metal layer 64", a wire, of the connecting wire 50, which is formed from a transparent conductive film such as an indium tin oxide film (hereinafter "ITO film") the same as the common electrode 24 and which is formed at the same time as the common electrode 24 as a lower-layer connecting wire 52, and a wire, of the connecting wire 50, which is formed from a transparent conductive film such as the ITO film the same as the pixel electrode 23 and which is formed at the same time as the pixel electrode 23 as an upper-layer connecting wire 51. Moreover, the upper-layer connecting wire 51 may also be referred to as a "first connecting wire", and the lower-layer connecting wire 52 as a "second connecting wire".

Figure 4:
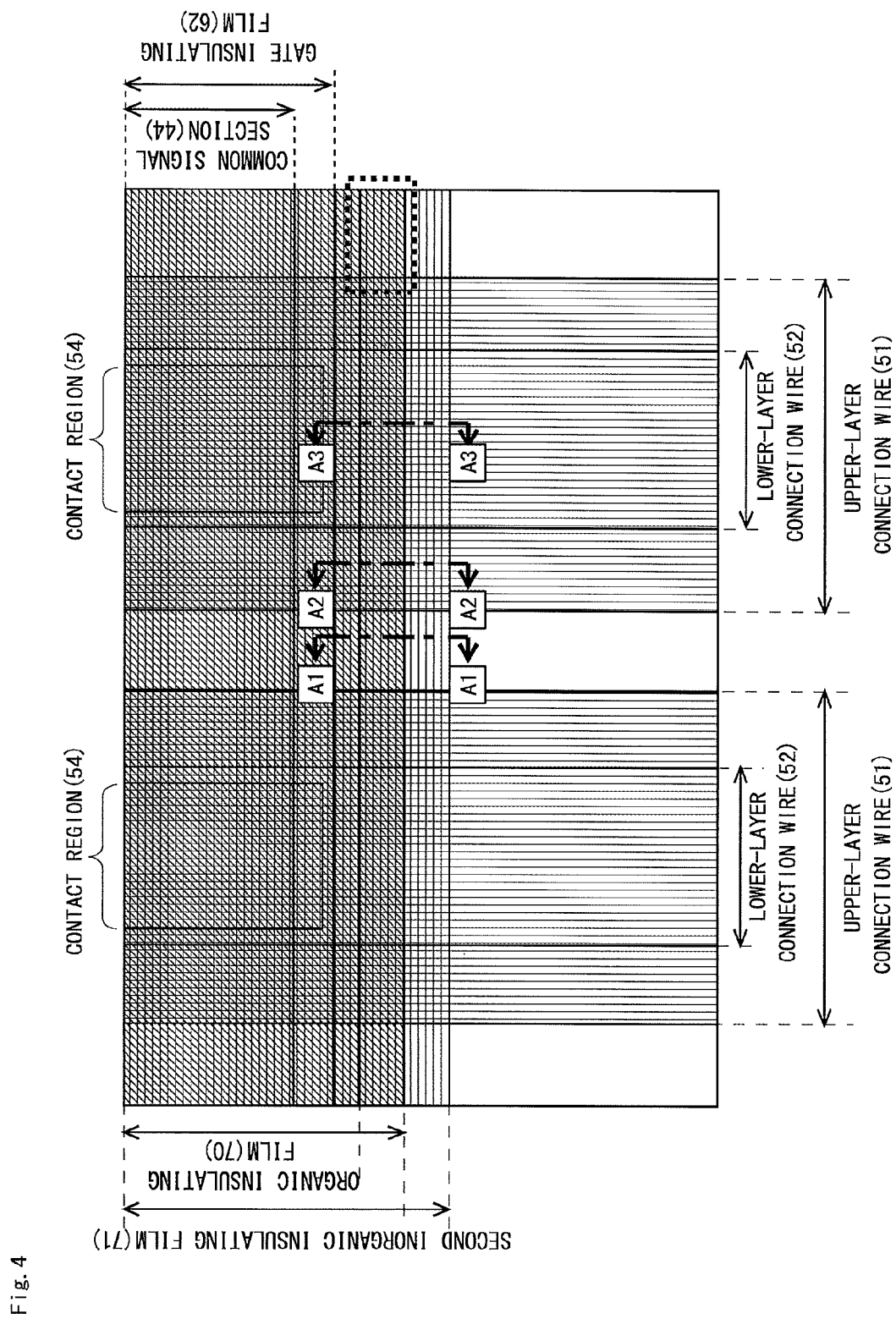
FIG. 4 is a plan view showing a region surrounded by a dotted line in FIG. 3 in an enlarged manner.

FIG. 4 is a plan view showing a region surrounded by a dotted line in FIG. 3 in an enlarged manner. As shown in FIG. 4, the common signal wire 44, which has a two-layer structure where the gate metal layer 61 and the source metal layer 64 are stacked, is formed in a horizontal direction. The connecting wire 50, which has a two-layer structure where the wide upper-layer connecting wire 51 is stacked on the narrow lower-layer connecting wire 52, is formed above the common signal wire 44 across a predetermined distance while being orthogonal to the common signal wire 44. Additionally, the gate metal layer 61 and the source metal layer 64 of the common signal wire 44 are electrically connected with each other. The resistance value of the common signal wire 44 is thereby reduced. Also, disconnection of the common signal wire 44 may be avoided as long as one of the gate metal layer 61 and the source metal layer 64 is connected even though the other is disconnected. As described above, by stacking the gate metal layer 61 and the source metal layer 64 together, a lower resistance and redundancy of the common signal wire 44 may be achieved. Note that, because the common signal wire 44 is formed from a laminated film where a large number of conductive layers and insulating layers are stacked together, it may sometimes be referred to as a "step portion" herein.

Additionally, each of the gate metal layer 61 and the source metal layer 64 are preferably a wire having a two-layer structure where a copper (Cu) film is stacked on a titanium (Ti) film. By stacking a copper film, a low resistance may be achieved for the gate metal layer 61 and the source metal layer 64. Furthermore, the gate insulating layer 62 and the channel etch stopper layer 63 separating the gate metal layer 61 and the source metal layer 64, and a first inorganic insulating film 65 and a second inorganic insulating film 71 are each formed from an inorganic insulating film of a silicon dioxide film ($SiO_2$) or a silicon nitride film (SiNx), for example.

The organic insulating film 70 covers the common signal wire 44 from the upper end in FIG. 4, and is formed extending to the position of edge line of the organic insulating film 70. The second inorganic insulating film 71 is formed extending from the upper end in FIG. 4 to the edge line of the second inorganic insulating film 71, over the edge line of the organic insulating film 70. Accordingly, the edge portion of the organic insulating film 70 is covered with the second inorganic insulating film 71.

Figure 5:
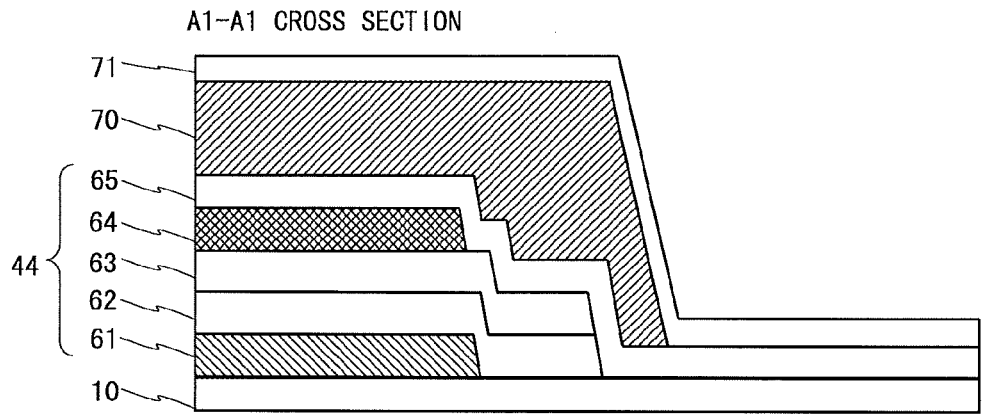
FIGS. 5(A) to 5(C) are cross-sectional views showing a region sandwiched by connecting wires in FIG. 4 and the shapes of cross sections of the connecting wire, and more specifically.
Figure 5:
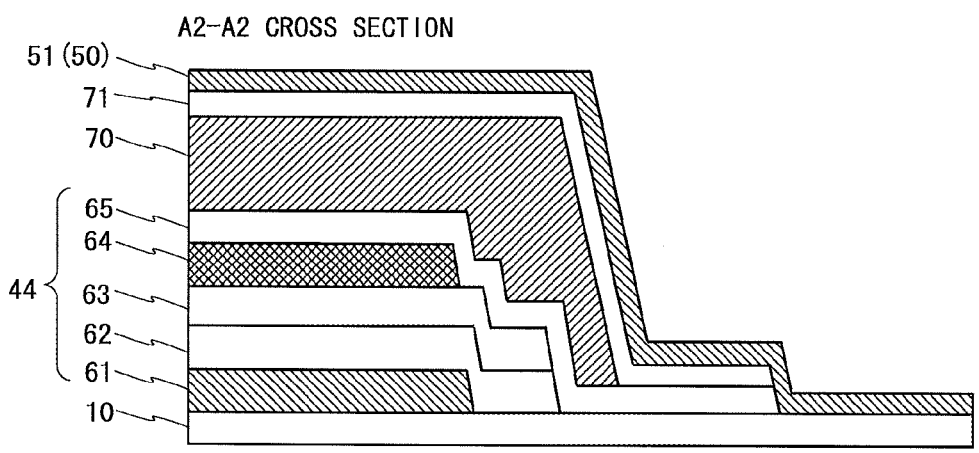
Figure 5:
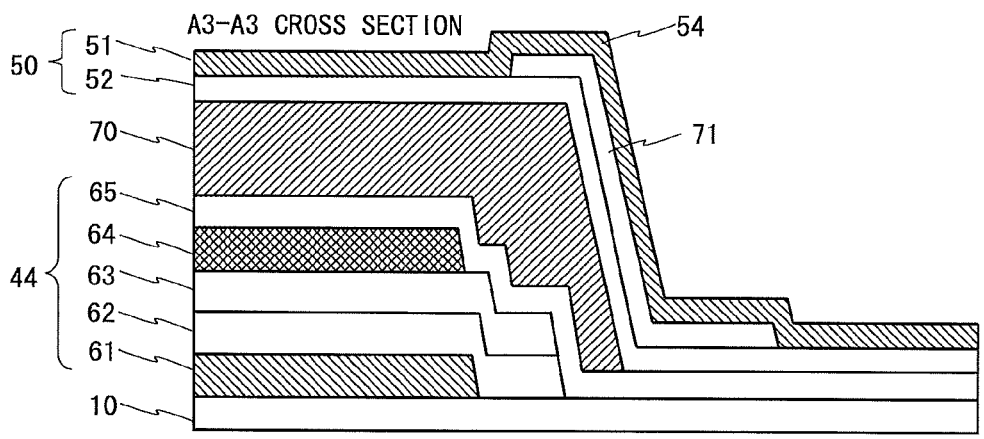

The cross section of the region sandwiched by adjacent connecting wires 50 in the plan view will be described. FIGS. 5(A) to 5(C) are cross-sectional views showing the region sandwiched by the connecting wires 50 and the shapes of cross sections of the connecting wire 50, and more specifically, FIG. 5(A) is a cross-sectional view showing the shape of the cross section of the region sandwiched by the connecting wires 50, along arrow. A1-A1, FIG. 5(B) is a cross-sectional view showing the shape of a cross section of an end portion of the connecting wire 50, along arrow A2-A2 and in the length direction, and FIG. 5(C) is a cross-sectional view showing the shape of a cross section of a center portion of the connecting wire 50, along arrow A3-A3 and in the length direction.

As shown in FIG. 5(A), at the region sandwiched by the connecting wires 50, the gate metal layer 61, the gate insulating layer 62, the channel etch stopper layer 63, and the source metal layer 64 constituting the common signal wire 44 are stacked upon one another. Also, the first inorganic insulating film 65, the organic insulating film 70, and the second inorganic insulating film 71 are stacked upon one another in this order in a manner covering the common signal wire 44. In this case, the edge portion of the organic insulating film 70 is covered with the second inorganic insulating film 71, and thus moisture in the air does not enter the inside of the organic insulating film. However, the inclination angle of the inclined surface of the organic insulating film 70 is large.

As shown in FIG. 5(B), the configuration of the common signal wire 44 is the same as in FIG. 5(A) also at an end portion of the connecting wire 50, and thus description thereof will not be repeated. The organic insulating film 70, the second inorganic insulating film 71, and the upper-layer connecting wire 51 are formed in a manner covering the common signal wire 44. Other than that the upper-layer connecting wire 51 is formed, as the connecting wire 50, on the second inorganic insulating film 71, the configuration is the same as the configuration of the connecting wire 50 shown in FIG. 5(A).

Because the end portion of the organic insulating film 70 is covered with the second inorganic insulating film 71, moisture in the air does not enter the inside of the organic insulating film. Also, the inclination angle of the inclined surface of the organic insulating film 70 is large as in the case shown in FIG. 5(A).

As shown in FIG. 5(C), the configuration of the common signal wire 44 is the same as in FIG. 5(A) also at the center portion of the connecting wire 50, and thus description thereof will not be repeated. The organic insulating film 70 is formed in a manner covering the common signal wire 44 However, unlike in the case shown in FIG. 5(A), the lower-layer connecting wire 52 is formed on the organic insulating film 70. Also, the second inorganic insulating film 71 is formed on the lower-layer connecting wire 52 formed on the inclined surface of the organic insulating film 70. The upper-layer connecting wire 51 is formed to cover the lower-layer connecting wire 52 and the second inorganic insulating film 71. In this manner, at the center portion of the connecting wire 50, the connecting wire 50 is a wire of a two-layer structure where the upper-layer connecting wire 51 is stacked upon the lower-layer connecting wire 52.

Also at the center portion of the connecting wire 50, the inclination angle of the inclined surface of the organic insulating film 70 is large as in FIG. 5(A). Because the end portion of the organic insulating film 70 is covered with the second inorganic insulating film 71, moisture in the air does not enter the inside of the organic insulating film. Also, the upper-layer connecting wire 51 and the lower-layer connecting wire 52 are electrically connected at a contact region 54 above the common signal wire 44. Accordingly, as in the case of the gate metal layer 61 and the source metal layer 64 of the common signal wire 44, a low resistance and redundancy are also realized for the connecting wire 50.

0.3 Comparative Example

Figure 6:
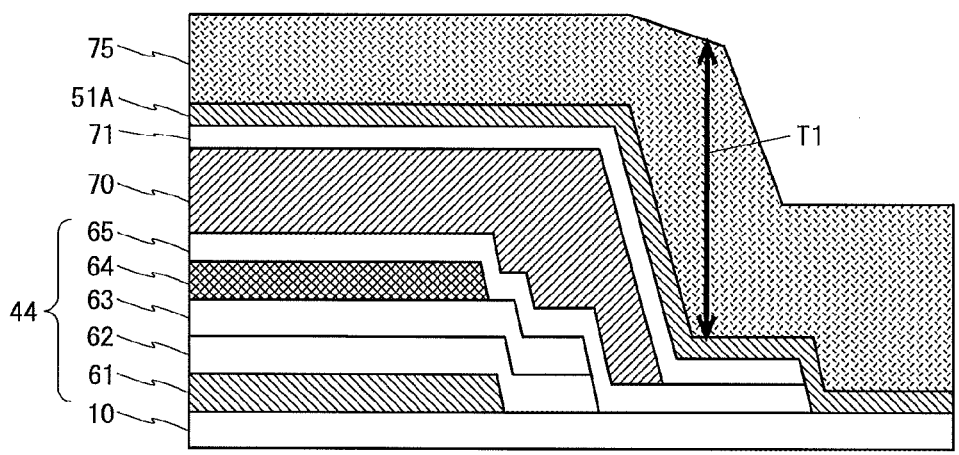
FIGS. 6(A) to 6(C) are diagrams for describing a reason why the adjacent connecting wires in FIG. 4 are electrically connected and leakage is caused, and more specifically.
Figure 6:
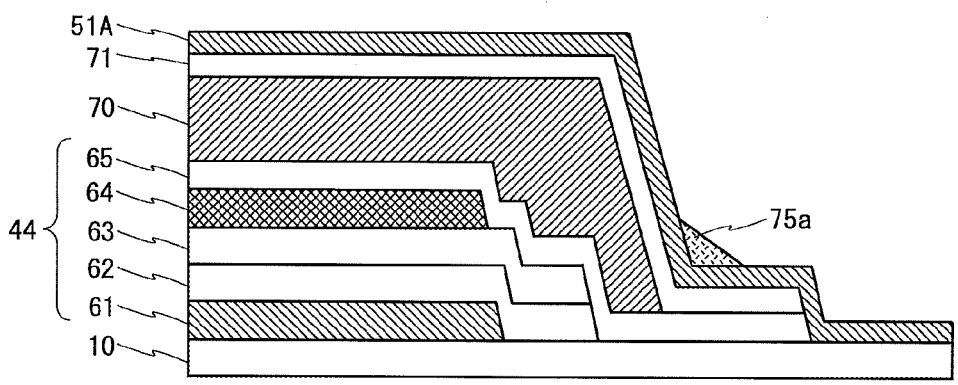
Figure 6:
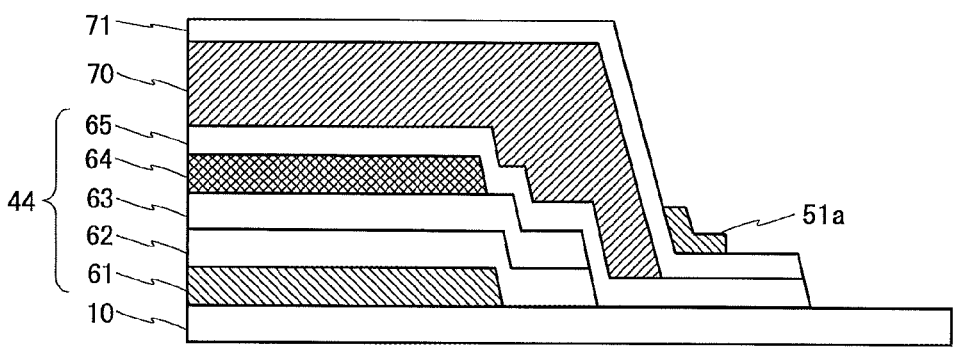

A problem occurring in e case where the inclination angle of the inclined surface of the organic insulating film 70 is large at the region sandwiched by adjacent connecting wires 50 will be described. FIGS. 6(A) to 6(C) are diagrams for describing a reason why the adjacent connecting wires 50 are electrically connected and leakage is caused, and more specifically, FIG. 6(A) is a cross-sectional view showing a state after a resist is applied to form the upper-layer connecting wire 51 by patterning an ITO film 51A at the region between the connecting wires 50, FIG. 6(B) is a cross-sectional view showing the resist remaining along the edge line of the organic insulating film 70 at the time of patterning, and FIG. 6(C) is a cross-sectional view showing an etching residue of the ITO film between the connecting wires.

As shown in FIG. 6(A), at the region between the connecting wires 50, an ITO film 51A to be the upper-layer connecting wire 51 is formed on the second inorganic insulating film 71 and the mother glass substrate 10, and furthermore, a resist 75 is applied on the ITO film 51A. In this case, the inclination angle is large at the inclined surface of the organic insulating film 70, and thus a film thickness T1 of the resist is thick along the edge line of the organic insulating film 70. When, in this state, the resist 75 is patterned by photolithography in order to perform patterning of the ITO film 51A, a resist 75a which is supposed to be removed by development remains along the edge line of the organic insulating film 70, as shown in FIG. 6(B).

Next, as shown in FIG. 6(C), when patterning the upper-layer connecting wire 51 by etching the ITO film 51A by using a resist pattern (not show) as a mask, the resist 75a remaining along the edge line also becomes a mask, and an ITO film 51a remains in a connected manner along the edge line where there is a resist residue. The adjacent connecting wires 50 are electrically connected by the ITO film 51a remaining in a connected manner, thereby causing a problem of leakage between the connecting wires 50.

In FIG. 6(C), leakage occurring between the upper-layer connecting wires 51 due to the resist 75a remaining in a connected manner between the upper-layer connecting wires 51 at the time of patterning the ITO films 51A and forming the upper-layer connecting wires 51 is described. However, also at the time of patterning the ITO films and forming the lower-layer connecting wires 52 while forming the common electrodes 24, a resist remaining between the lower-layer connecting wires 52 may become a mask, and an ITO film that electrically connects the adjacent lower-layer connecting wires 52 may remain. However, since the width of the lower-layer connecting wires 52 is narrower than the width of the upper-layer connecting wires 51, the gap between the lower-layer connecting wires 52 is increased accordingly. Consequently, leakage may occur between the lower-layer connecting wires 52, although with less possibility than for the upper-layer connecting wires 51.

1. First Embodiment

Configurations of a liquid crystal display device and a cell formed on a mother glass substrate to which a first embodiment of the present invention is applied are the same as the basic configurations of the liquid crystal display device 1 shown in FIG. 1 and the cell 2 shown in FIG. 2. Thus, description thereof will not be repeated.

1.1 Configuration of Connecting Wire

As described above, the increased inclination angle of the inclined surface of the ITO film 51A formed on the organic insulating film 70 shown in FIG. 6(A) due to the large inclination angle of the inclined surface of the organic insulating film 70, as well as the increased film thickness T1 of the resist 75 along the edge line of the organic insulating film 70 are assumed to be the cause of leakage. Accordingly, it is assumed that, if the inclination of the inclined surface of the organic insulating film 70 is made gradual and the film thickness T1 of the resist 75 along the edge line is made thin at the time of applying the resist 75, leakage due to connection by the remaining resist 75a may be prevented. Accordingly, in the first embodiment, the connection wire 50 is configured as follows.

Figure 7:
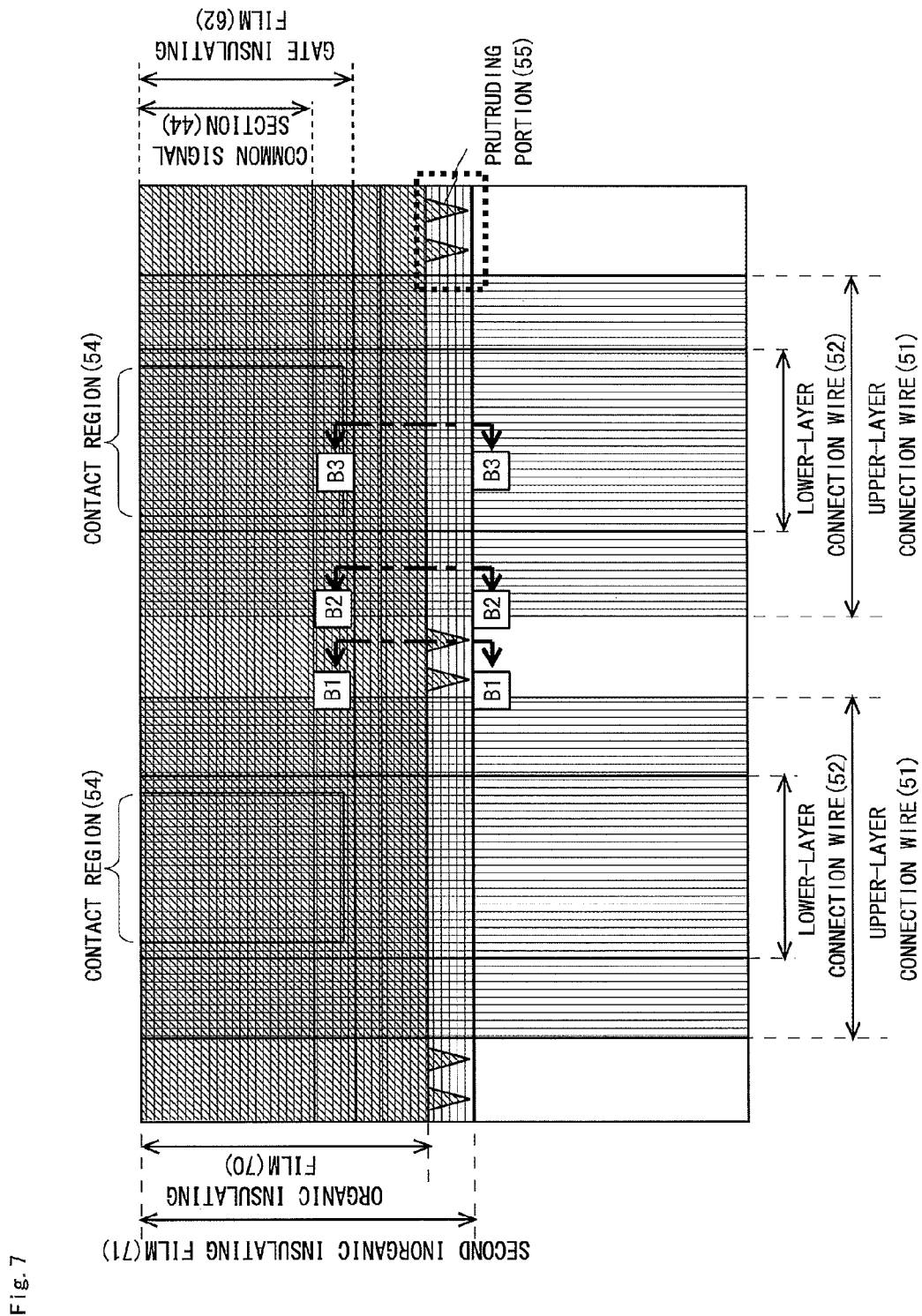
FIG. 7 is a plan view showing a configuration of connecting wires of a first embodiment.

FIG. 7 is a plan view showing a configuration of connecting wires 50 of the present embodiment. Components in the plan view shown in FIG. 7 that are different from those in the plan view shown in FIG. 4 will be described. As shown in FIG. 7, in the present embodiment, protruding portions 55 are formed at the edge portion of the organic insulating film 70, at a region sandwiched by adjacent upper-layer connecting wires 51. Additionally, as shown in FIG. 7, also in this case, to prevent moisture from entering the inside of the organic insulating film 70, the edge portion of the organic insulating film 70 including the protruding portions 55 is formed more inward than the edge portion of the second inorganic insulating film 71. Accordingly, the edge portion of the organic insulating film 70 is covered with the edge portion of the second inorganic insulating film 71, and no issue on the reliability of the connecting wires 50 will be made by moisture in the air.

Figure 8:
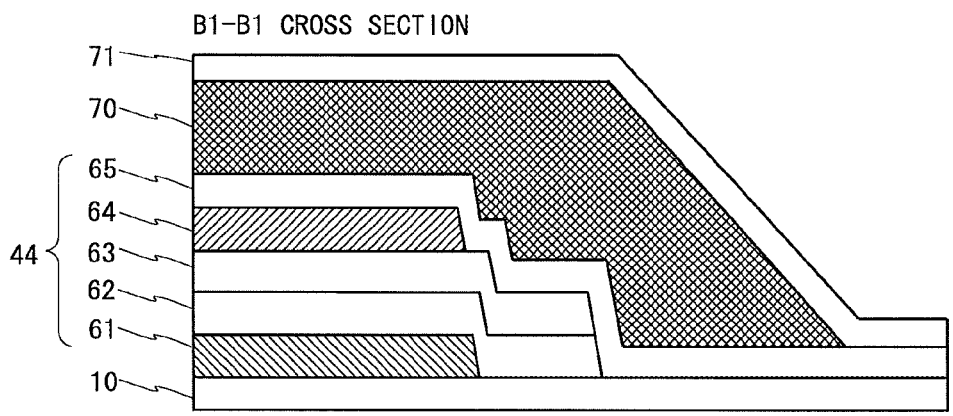
FIGS. 8(A) to 8(C) are cross-sectional views showing a region sandwiched by the connecting wires in FIG. 7 and the shapes of cross sections of the connecting wire, and more specifically.
Figure 8:
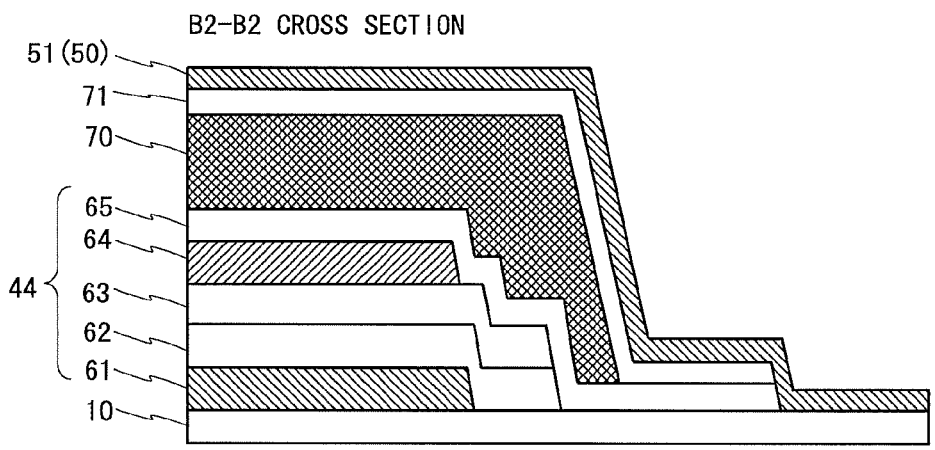
Figure 8:
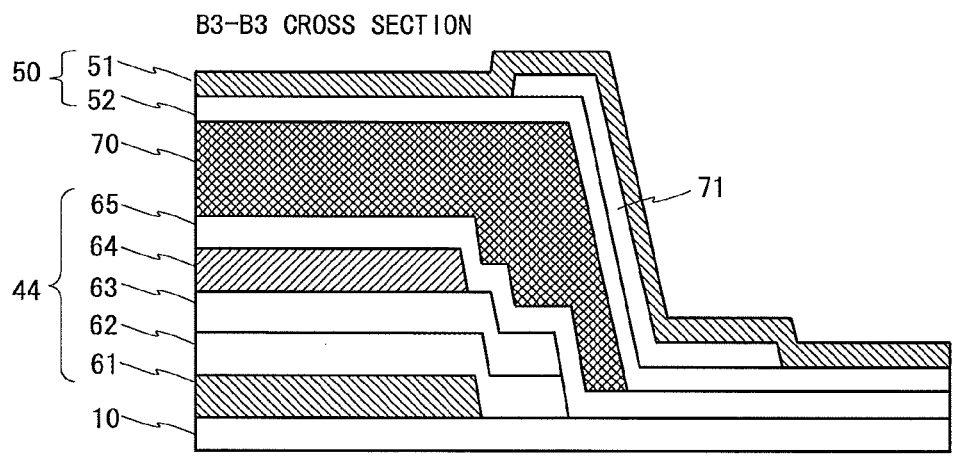

FIGS. 8(A) to 8(C) are cross-sectional views showing a region sandwiched by the connecting wires 50 in FIG. 7 and the shapes of cross sections of the connecting wire 50, and more specifically, FIG. 8(A) is a cross-sectional view showing the shape of a cross section of the region sandwiched by the connecting wires 50, along arrow B1-B1, FIG. 8(B) is a cross-sectional view showing the shape of a cross section of an end portion of the connecting wire 50, along arrow B2-B2 and in the length direction, and FIG. 8(C) is a cross-sectional view showing the shape of a cross section of a center portion of the connecting wire 50, along arrow B3-B3 and in the length direction.

As shown in FIG. 8(A), at the region between adjacent connecting wires 50, the configuration is the same as that shown in the cross-sectional view in FIG. 6(A) except for the inclination angles of the inclined surfaces of the organic insulating film 70 and the second inorganic insulating film 71. Because the protruding portions 55 are provided to the edge line of the organic insulating film 70, the inclination of the inclined surface of the organic insulating film 70 is more gradual compared to the case shown in FIG. 6(A). On the other hand, because the position of the edge portion of the second inorganic insulating film 71 is approximately at the same position as shown in FIG. 6(A), the distance between the tip ends of the protruding portions 55 of the organic insulating film 70 and the edge portion of the second inorganic insulating film 71, that is, the length of the second inorganic insulating film 71 covering the tip ends of the protruding portions 55 is short, being about 3 μm. However, also in this case, the edge portion of the organic insulating film 70 including the protruding portions 55 is covered with the second inorganic insulating film 71.

Additionally, as shown in FIGS. 8(B) and 8(C), the inclination of the inclined surface of the organic insulating film 70 at the end portion and at the center portion of the connecting wire 50 is high as in the case shown in FIGS. 6(B) and 6(C). Accordingly, in either case, the film thickness of the resist remaining along the edge line of the organic insulating film 70 is thick, but it is at a region where the resist is to remain as a pattern on the ITO film at the time of forming the upper-layer connecting wire 51, and thus, the remaining resist is not a resist which is supposed to be removed by development.

As described above, in the region sandwiched by adjacent connecting wires 50, the inclination angle of the organic insulating film 70 is made small by forming the protruding portions 55 at the edge portion of the organic insulating film 70. Thus, the film thickness, along the edge line, of the resist which is applied at the time of forming the upper-layer connecting wire 51 is reduced. Accordingly, the resist which is to be removed at the time of development is less likely to remain in a connected manner, and occurrence of leakage between the adjacent connecting wires 50 may be suppressed.

1.2 Method for Forming Connecting Wire

Figure 9:
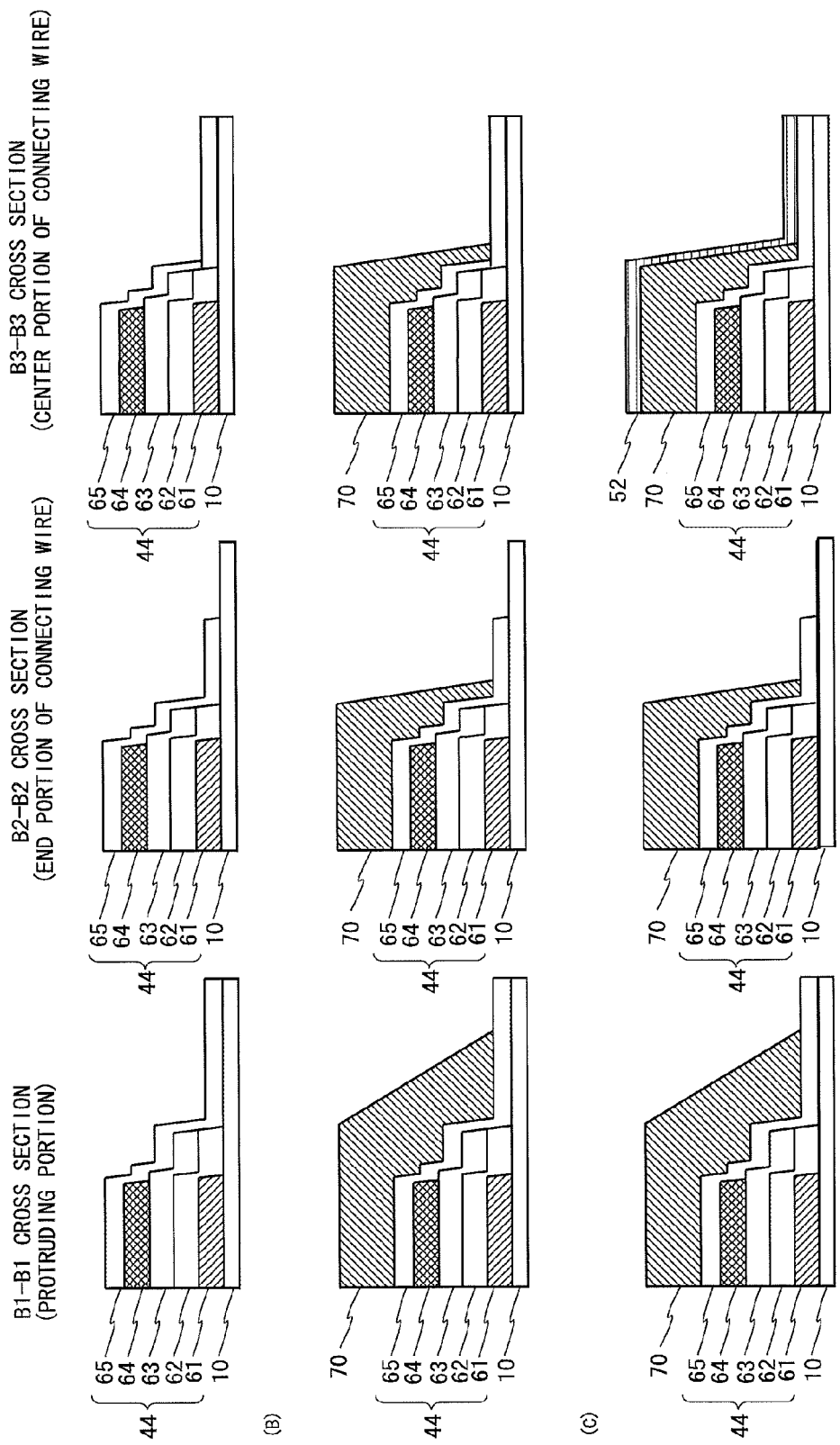
FIGS. 9(A) to 9(C) are diagrams showing steps for forming an array substrate on a mother glass substrate, according to the first embodiment.

A method for forming an array substrate on the mother glass substrate 10 will be described. FIGS. 9(A) to 9(C) and FIGS. 10(A) and 10(B) are diagrams showing steps for forming an array substrate on the mother glass substrate 10. In FIGS. 9(A) to 9(C) and FIGS. 10(A) and 10(B), cross sections of the protruding portion 55 between the connecting wires 50, the end portion of the connecting wire 50, and the center portion of the connecting wire 50 are shown in this order from the left, in relation to the regions shown in FIGS. 8(A) to 8(C). First, as shown in FIG. 9(A), steps up to formation of the common signal wire 44 are the same for any of the regions. First, a titanium film is formed on the mother glass substrate 10 by spattering, and a copper film is subsequently formed. Next, a resist pattern is formed by photolithography, and etching is performed on the copper film and the titanium film in this order by using the resist pattern as the mask, and the gate metal layer 61 is formed. At this time, the gate electrode of the TFT 22 and the scanning signal line 32 are formed for the pixel formation portion 21. Noe that the reason for making the gate metal layer 61 a two-layer structure and stacking a copper film on the surface is to reduce the resistance of the gate metal layer 61.

A silicon nitride film (SiNx) is formed by a plasma CVD method. Next, a resist pattern is formed by photolithography, and patterning is performed on the silicon nitride film by using the resist pattern as the mask, and the gate insulating layer 62 is formed. At this time, the gate insulating film is formed on the gate electrode of the TFT portion 22. Then, by forming and patterning an amorphous silicon film, a semiconductor layer is formed at the TFT portion 22. Additionally, the amorphous silicon film which is formed is removed from the connecting wire 50.

Furthermore, a silicon nitride film is formed and patterned, and the channel etch stopper layer 63 is formed on the gate insulating layer 62 for the connecting wire 50, and at the TFT portion 22, a channel etch stopper layer configured to protect the semiconductor layer is formed, and a contact hole configured to connect the source electrode and the drain electrode is formed on the semiconductor layer.

Additionally, a configuration in which a channel etch stopper layer configured to protect the semiconductor layer is not formed is also conceivable, and in this case, the channel etch stopper layer 63 of the connecting wire 50 is not formed either.

A titanium film is formed by spattering, and a copper film is sequentially formed. Next, the source metal layer 64 is formed in a stacked manner by photolithography, in the same manner as the case in which the gate metal layer 61 was formed. At this time, a source electrode and a drain electrode connected to a channel layer as well as the data signal line 33 are formed at the TFT portion 22. A silicon nitride film as the first inorganic insulating film 65 is formed on the source metal layer 64 by the plasma CVD method.

As shown in FIG. 9(B), as the organic insulating film 70, a photosensitive acrylic resin, for example, is applied in a thickness of 1 to 4 µm by slit coating or spin coating, and patterning is performed by photolithography. At this time, at the TFT portion 22, a contact hole is opened to the organic insulating film on the already formed drain electrode for electrical connection to the pixel electrode 23 to be described later. Protruding patterns are formed on a mask used for patterning the organic insulating film 70, at a position corresponding to between the adjacent connecting wires 50. Accordingly, as described in details later, due to the protruding portions 55 formed, the inclination of the inclined surface of the organic insulating film 70 between the connecting wires 50 after development is made more gradual compared to the inclination of the inclined surface of the organic insulating film 70 on the connecting wires 50. As shown in FIG. 9(C), an ITO film to be the common electrode 24 is formed by spattering, and by performing patterning, the lower-layer connecting wire 52 is formed at the center portion on the connecting wire 50.

Figure 10:
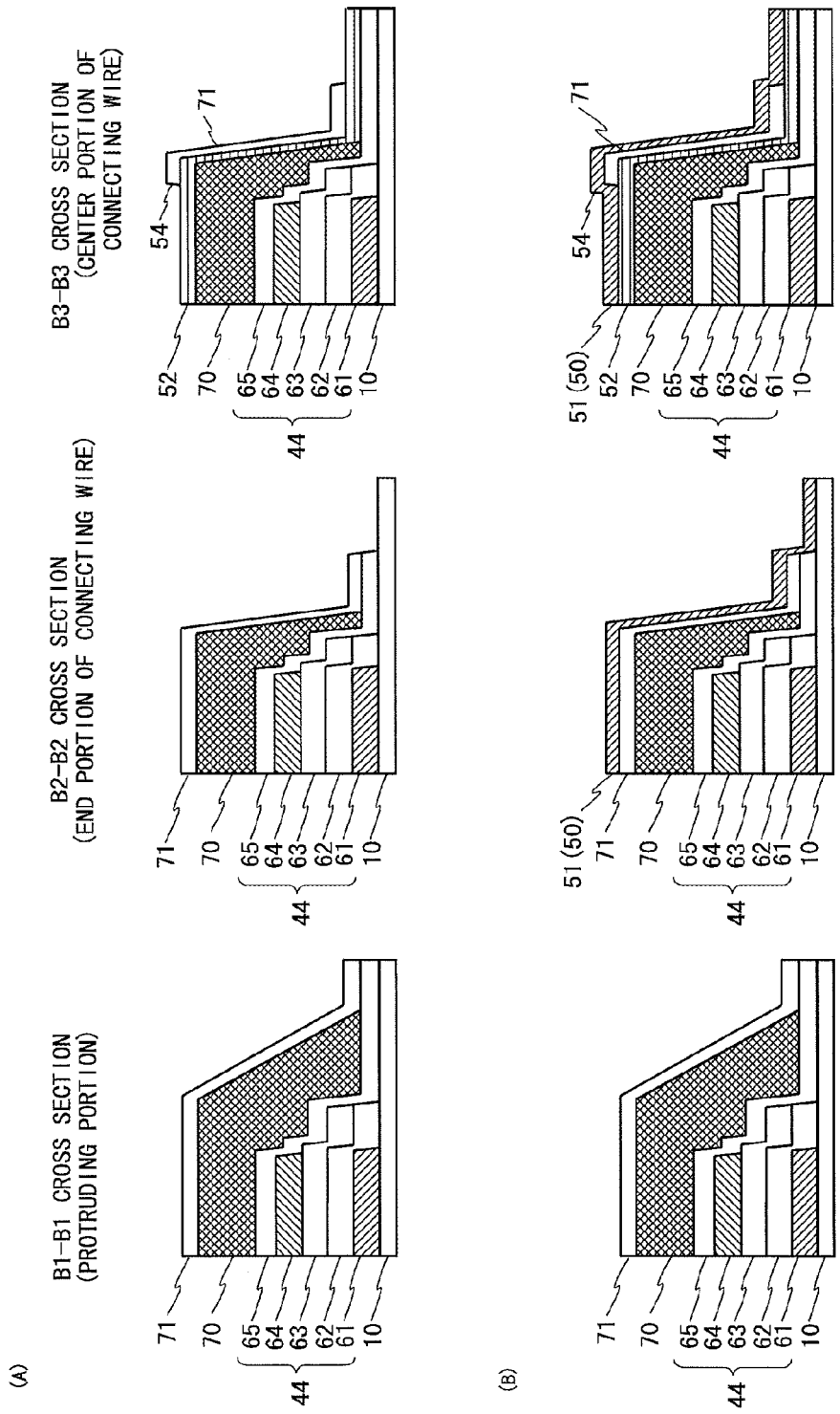
FIGS. 10(A) and 10(B) are diagrams showing steps, subsequent to the steps shown in FIGS. 9(A) to 9(C), for forming an array substrate on a mother glass substrate, according to the first embodiment.

Next, as shown in FIG. 10(A), a silicon nitride film is formed by the plasma CVD method, and patterning is performed by photolithography. The second inorganic insulating film 71 is thereby formed. The second inorganic insulating film 71 covers the organic insulating film 70 at the protruding portions between the connecting wires 50 and at the end portion of the connecting wire 50. At the center portion of the connecting wire 50, the contact region 54 is opened for connection to the upper-layer connecting wire 51 to be described later, and the second inorganic insulating film 71 covers the inclined surface of the organic insulating film 70. Accordingly, in any of the regions, the edge portion of the organic insulating film 70 is covered with the second inorganic insulating film 71. Also, at the TFT portion 22, a contact hole is opened, to the second inorganic insulating film, on the drain electrode for electrical connection to the pixel electrode 23 to be described later.

As shown in FIG. 10(B), an ITO film is formed by spattering, and etching is performed by photolithography. Accordingly, at the center portion of the connecting wire 50, the upper-layer connecting wire 51 connected to the lower-layer connecting wire 52 through the contact region 54 is formed, and at the end portion of the connecting wire 50, the upper-layer connecting wire 51 is formed on the second inorganic insulating film 71, and at the protruding portions 55 formed at the region between the connecting wires 50, the ITO film is removed, and the second inorganic insulating film 71 covering the organic insulating film 70 is exposed. Also, at the TFT portion 22, the pixel electrode 23 which is connected to the drain electrode through the contact hole is formed.

Additionally, in the description given above, it is described that a silicon nitride film is used for the gate insulating layer 62, the channel etch stopper layer 63, the first inorganic insulating film 65, and the second inorganic insulating film 71. However, a silicon dioxide film ($SiO_2$), a laminated film of a silicon nitride film and a silicon dioxide film or the like may alternatively be used. Also, indium gallium zinc oxide (InGaZnO) may be used for the semiconductor layer, for example. Moreover, a transparent conductive film of indium zinc oxide (IZO) or the like may be used, instead of ITO, for the pixel electrode 23 and the common electrode 24.

1.3 Protruding Pattern

Figure 11:
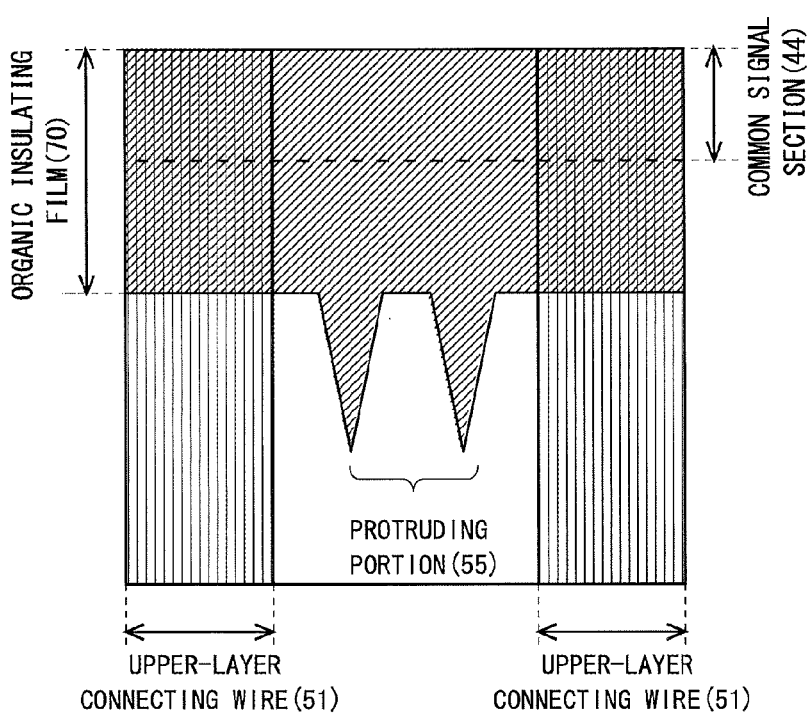
FIGS. 11(A) and 11(B) are plan views showing a region between the connecting wires shown in FIG. 7 in an enlarged manner, and more specifically.
Figure 11:
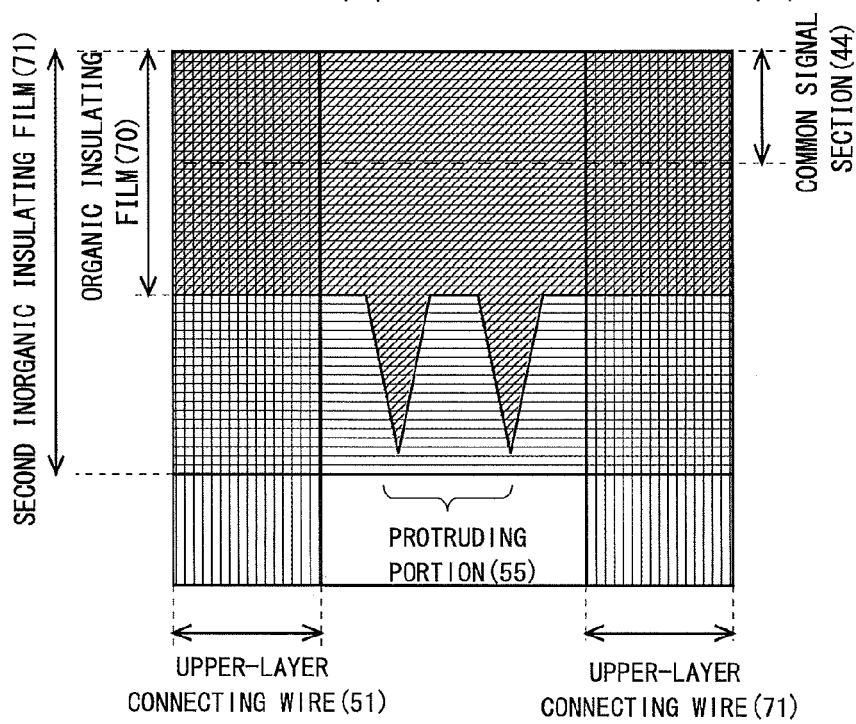

FIGS. 11(A) and 11(B) are plan views showing the region between the connecting wires 50 shown in FIG. 7 in an enlarged manner, and more specifically, FIG. 11(A) is a diagram showing the shape of the organic insulating film 70 before the second inorganic insulating film 71 is formed, and FIG. 11(B) is a diagram showing the shape of the organic insulating film 70 after the second inorganic insulating film 71 is formed. As shown in FIG. 11(A), two protruding portions 55, each having a triangular shape in plan view, are formed at the edge line of the organic insulating film 70 at the region sandwiched by two connecting wires 50 that are parallel to each other. As shown in FIG. 11(B), the tip ends of the protruding portions 55 protrude toward the edge portion of the second inorganic insulating film 71. However, because they are positioned more inward than the edge portion of the second inorganic insulating film 71, the edge portion of the organic insulating film 70 including the protruding portions 55 is covered with the second inorganic insulating film 71.

Figure 12:
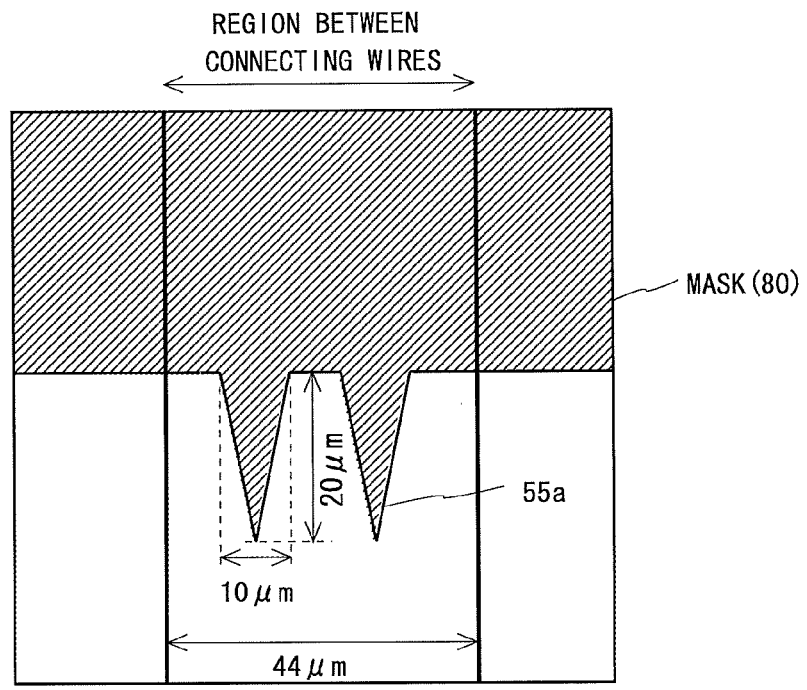
FIG. 12 is a diagram showing a part of a mask used in the first embodiment, to which protruding patterns of triangular shape are formed.
Figure 13:
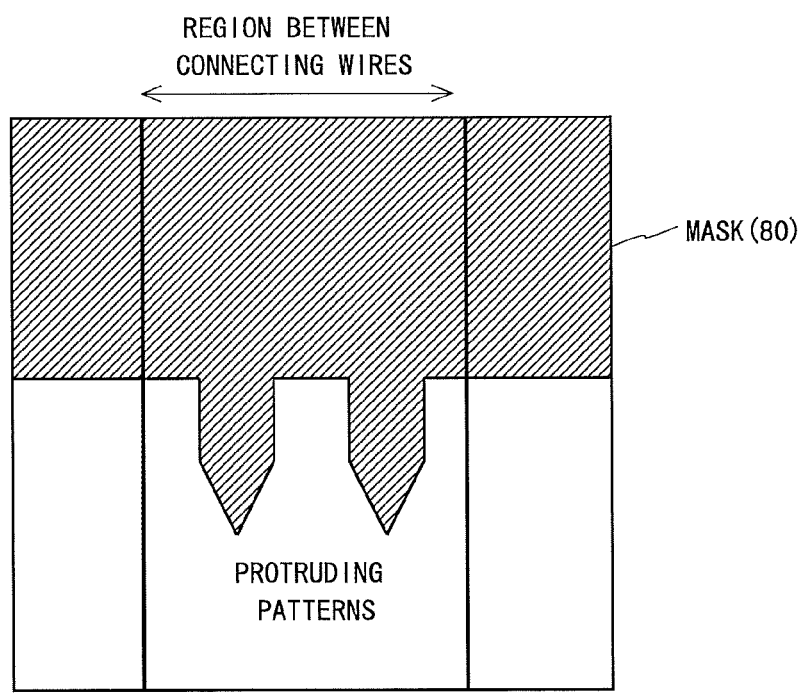
FIG. 13 is a diagram showing a part of a mask that can be used in the first embodiment, to which protruding patterns of pentagonal shape are formed.

The shape of protruding patterns 55a formed on a mask 80 used at the time of patterning the protruding portions 55 by using photolithography will be described. FIG. 12 is a diagram showing a part of the mask 80 used to which the protruding patterns 55a of triangular shape are formed. For example, as shown in FIG. 12, in the case where the gap between adjacent connecting wires is 44 µm, the mask 80 to which two protruding patterns 55a are formed is used, each protruding pattern having the shape of an isosceles triangle whose base is 10 µm and whose height is 20 µm. Additionally, the shape of the protruding pattern 55a is not limited to a triangle as long as it has a sharp tip end, and may be a pentagon as shown in FIG. 13, for example. Also, the number of the protruding patterns 55a formed between the connecting wires 50 is not limited to two, and the number may be one or, in the case where the gap between the connecting wires 50 is wide, three or more.

Figure 14:
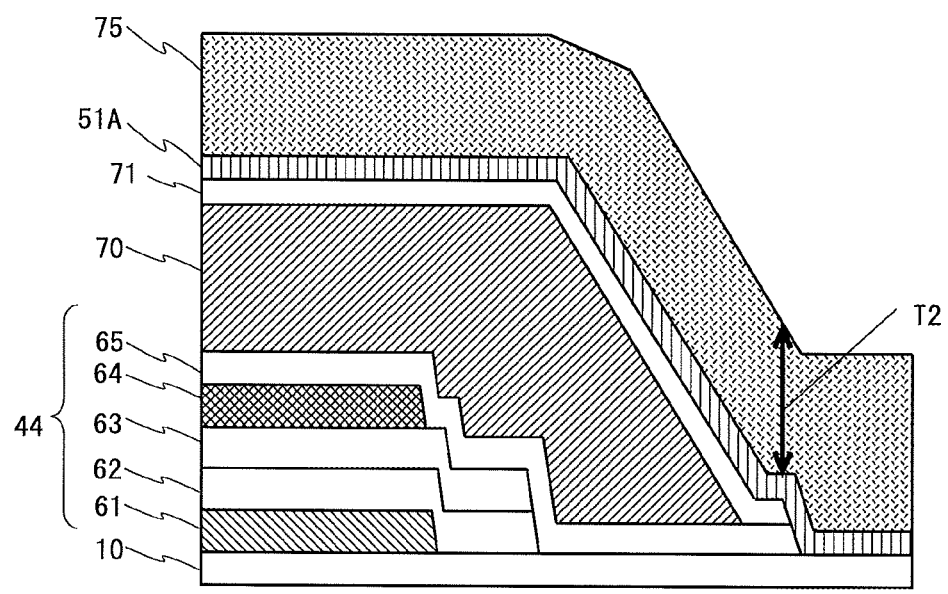
FIG. 14 is a cross-sectional view showing a state after a resist is applied to form an upper-layer connecting wire by patterning an ITO film at a region between the connecting wires.

FIG. 14 is a cross-sectional view showing a state after a resist is applied to form the upper-layer connecting wire 51 by patterning the ITO film 51A at the region between the connecting wires 50. As shown in FIG. 14, at the region between the connecting wires 50, the ITO film 51A to be the upper-layer connecting wire 51 is formed on the second inorganic insulating film 71 and the mother glass substrate 10, and the resist 75 is applied on the ITO film 51A. In this case, as the inclination angle of the inclined surface of the organic insulating film 70 is small, a film thickness T2 of the resist along the edge line of the organic insulating film 70 is thinner compared to the film thickness T1 shown in FIG. 6(A). When, in this state, the resist 75 is patterned by photolithography in order to perform patterning of the ITO film 51A, the resist 75a will not remain in a connected manner after development.

Figure 15:
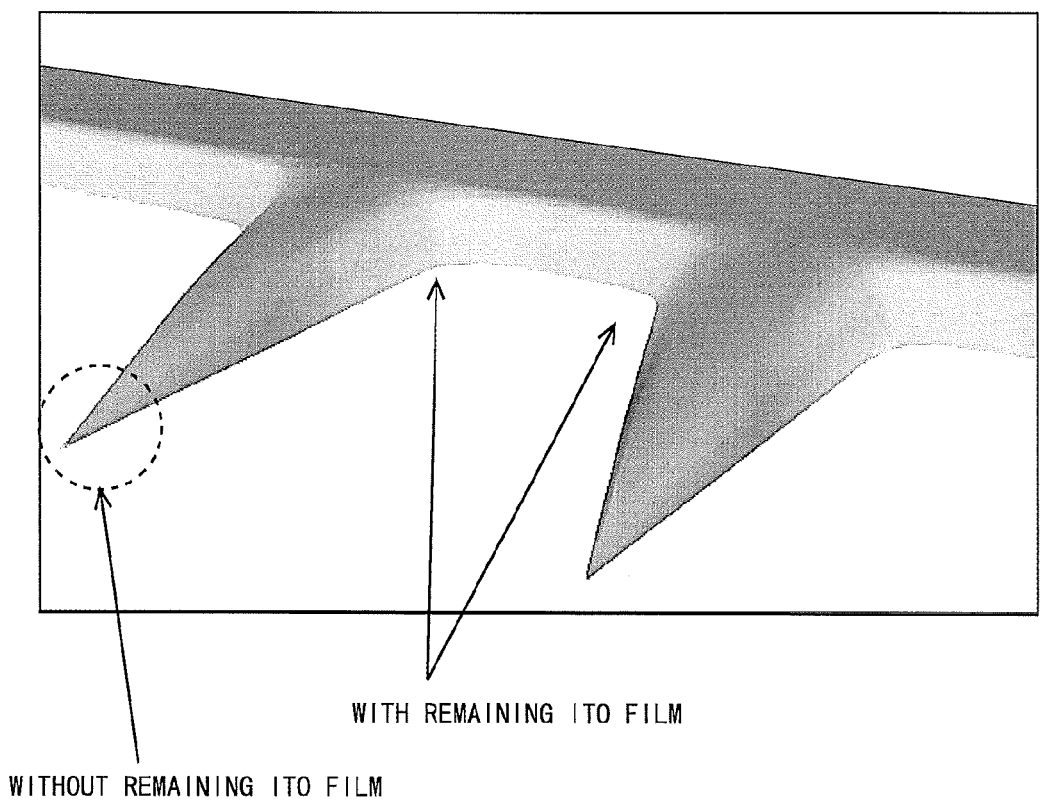
FIG. 15 is a perspective view showing the shape of an organic insulating film near protruding portions at a region sandwiched by adjacent connecting wires, according to the first embodiment.

FIG. 15 is a perspective view showing the shape of the organic insulating film 70 near the protruding portions 55 at the region sandwiched by the adjacent connecting wires 50. As shown in FIG. 15, each of the two protruding portions 55 has a triangular shape in plan view, and is sloped so that its height is reduced toward the tip end, and tapers formed on side surfaces of the protruding portion 55 are made more gradual toward the tip end. Therefore, near the bases of the protruding portions 55, the resist that was applied at the time of forming the upper-layer connecting wires 51 by patterning the ITO film remains without being removed, and the ITO film also remains. However, near the tip ends of the protruding portions 55, the inclination of the organic insulating film 70 is gradual and there is no remaining resist, and thus, there is no remaining ITO film. As described above, by providing the protruding portions 55 between the adjacent connecting wires 50, the ITO film may remain along the edges of the protruding portions 55 at near the bases of the protruding portions 55, but the ITO film does not remain near the tip ends. Accordingly, the ITO film that connects the adjacent connecting wires 50 is not formed along the edge of the organic insulating film 70. Therefore, the adjacent connecting wires 50 are not electrically connected, and leakage is not caused between the two.

Figure 16:
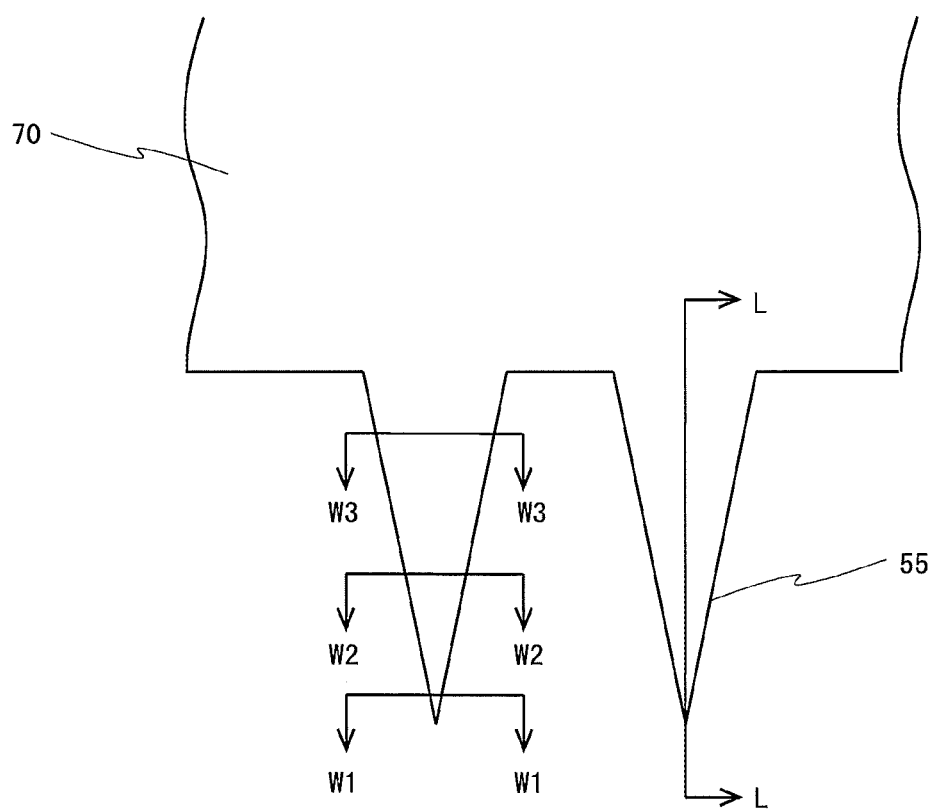
FIG. 16 is a plan view showing the shape of the protruding portions, according to the first embodiment.
Figure 17:
FIGS. 17(A) to 17(D) are cross-sectional views showing shapes of cross sections of the protruding portion shown in FIG. 16, and more specifically.
Figure 17:
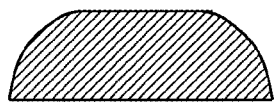
Figure 17:
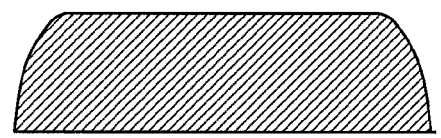
Figure 17:
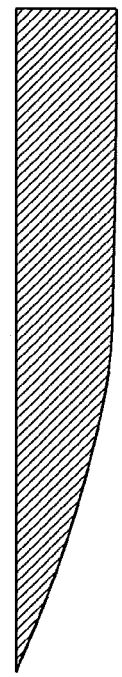

The cross-sectional shape of the protruding portion 55 will be described in greater detail. FIG. 16 is a plan view showing the shape of the protruding portions 55, and FIGS. 17(A) to 17(D) are cross-sectional views showing shapes of cross sections of the protruding portion 55 shown in FIG. 16. More specifically, FIG. 17(A) is a cross-sectional view showing the shape of a transverse cross-section of the protruding portion 55 along arrow W1-W1 shown in FIG. 16, FIG. 17(B) is a cross-sectional view showing the shape of a transverse cross-section of the protruding portion 55 along arrow W2-W2 shown in FIG. 16, FIG. 17(C) is a cross-sectional view showing the shape of a transverse cross-section of the protruding portion 55 along arrow W3-W3 shown in FIG. 16, and FIG. 17(D) is a cross-sectional view showing the shape of a longitudinal cross-section along arrow L-L shown in FIG. 16.

If overexposure is performed using the triangular protruding patterns 55a shown in FIG. 12, exposure light reaches the inside of the protruding patterns 55a by diffraction. Accordingly, as shown in FIG. 17(A), at the tip end of the protruding portion 55, the organic insulating film 70 is exposed to the exposure light reaching from both sides of the mask. The film thickness of the organic insulating film 70 forming the protruding portion 55 is thus reduced, and also, the width is narrower than the width of the protruding pattern 55a at the corresponding position. Accordingly, the position of the tip end of the protruding portion 55 is retracted from the position of the tip end of the protruding pattern 55a.

As shown in FIG. 17(B), also near the center portion of the protruding portion 55, tapers are formed on left and right side surfaces due to the exposure light reaching by diffraction; however, the inclination is higher than in FIG. 17(A). Furthermore, as shown in FIG. 17(C), also at the base of the protruding portion 55, tapers are formed on the side surfaces, and the inclination is even more higher. As shown in FIG. 17(D), in the length direction of the protruding portion 55, the inclination is gradually increased from near the base toward the tip end, and becomes linearly inclined near the tip end. Moreover, as can be seen from the cross-sectional views, the protruding portion 55 is reduced in width and height toward the tip end. Accordingly, at the time of forming the upper-layer connecting wire 51 by using the applied resist as a mask and etching the ITO film, the inclination is gradual at the tip end of the protruding portion 55, and there is no residue of the ITO film due to the resist residue. As a result, the ITO film is reliably removed at least at the tip end of the protruding portion 55, and the adjacent connecting wires 50 are not electrically connected, and no leakage is caused between the connecting wires 50.

Additionally, also at the time of patterning the ITO film to form the lower-layer connecting wire 52, as in the case of forming the upper-layer connecting wires 51, forming the protruding portions 55 between the lower-layer connecting wires 52 is an effective method for preventing occurrence of leakage between the lower-layer connecting wires 52. However, this method is more effective when it is applied at the time of forming the upper-layer connecting wires 51 with a narrow gap than at the time of forming the lower-layer connecting wires 52 with a wide gap.

1.4 Effect

According to the present embodiment, overexposure is performed using the mask 80 including shapes of the protruding patterns 55a with sharp tip ends at a position corresponding to the pattern edge of the organic insulating film 70 between adjacent connecting wires 50. This makes the inclination of the inclined surface of the organic insulating film 70 sandwiched by the connecting wires 50 be gradual, and thus, at the time of forming the connecting wires 50, the film thickness of the resist along the edge line of the organic insulating film 70 may be prevented from becoming thick. As a result, the resist does not remain in a connected manner at the region sandwiched by the adjacent connecting wires 50 at the time of forming the resist pattern for the connecting wires 50, and leakage between the adjacent connecting wires 50 may be prevented.

1.5 Modification

Figure 18:
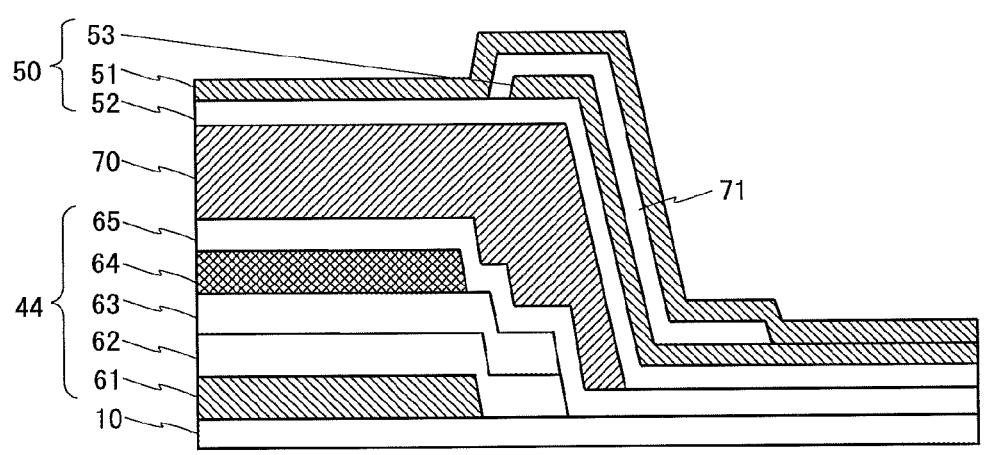
FIG. 18 is a diagram showing a cross section of a center portion of a connecting wire according to an modification of the first embodiment.

FIG. 18 is a diagram showing a cross section of a center portion of the connecting wire 50 according to an modification of the present embodiment. Unlike the case of the connecting wire 50 shown in FIG. 8(C), the connecting wire 50 of the present modification as shown in FIG. 18 further includes, between the lower-layer connecting wire 52 of a transparent conductive film such as an ITO film and the upper-layer connecting wire 51, a second lower-layer connecting wire 53 of, for example, a low resistance copper film. By additionally forming the second lower-layer connecting wire 53 with a low resistance in this manner, the resistance of the connecting wire 50 may be further reduced. Accordingly, even if the width of the connecting wire 50 is reduced, the resistance value may be maintained at a low value. Also, in the case where the resistance values of the connecting wires 50 are the same, the width of the connecting wires 50 may be reduced to increase the gap between the adjacent connecting wires 50, allowing a greater number of protruding portions 55 to be formed between the connecting wires 50. Accordingly, leakage between the connecting wires 50 may be even more prevented. Additionally, the second lower-layer connecting wire 53 may also be referred to as a "third connecting wire". Also, the gate metal layer 61 and the source metal layer 64 may also be referred to as a "conductive layer".

Note that the metal film that can be used for the second lower-layer connecting wire 53 is not limited to a copper film, and it is also possible to use a metal film whose resistance is lower than that of a transparent conductive film, such as a molybdenum (Mo) film, an aluminum (Al) film, or a laminated film of an aluminum film and a molybdenum film. Also, in FIG. 18, the second lower-layer connecting wire 53 is formed on the upper surface of the lower-layer connecting wire 52. However, it may alternatively be formed on the lower surface of the lower-layer connecting wire 52, or it is also possible to eliminate the lower-layer connecting wire 52 and to form only the second lower-layer connecting wire 53.

2.0 Second Embodiment

Figure 19:
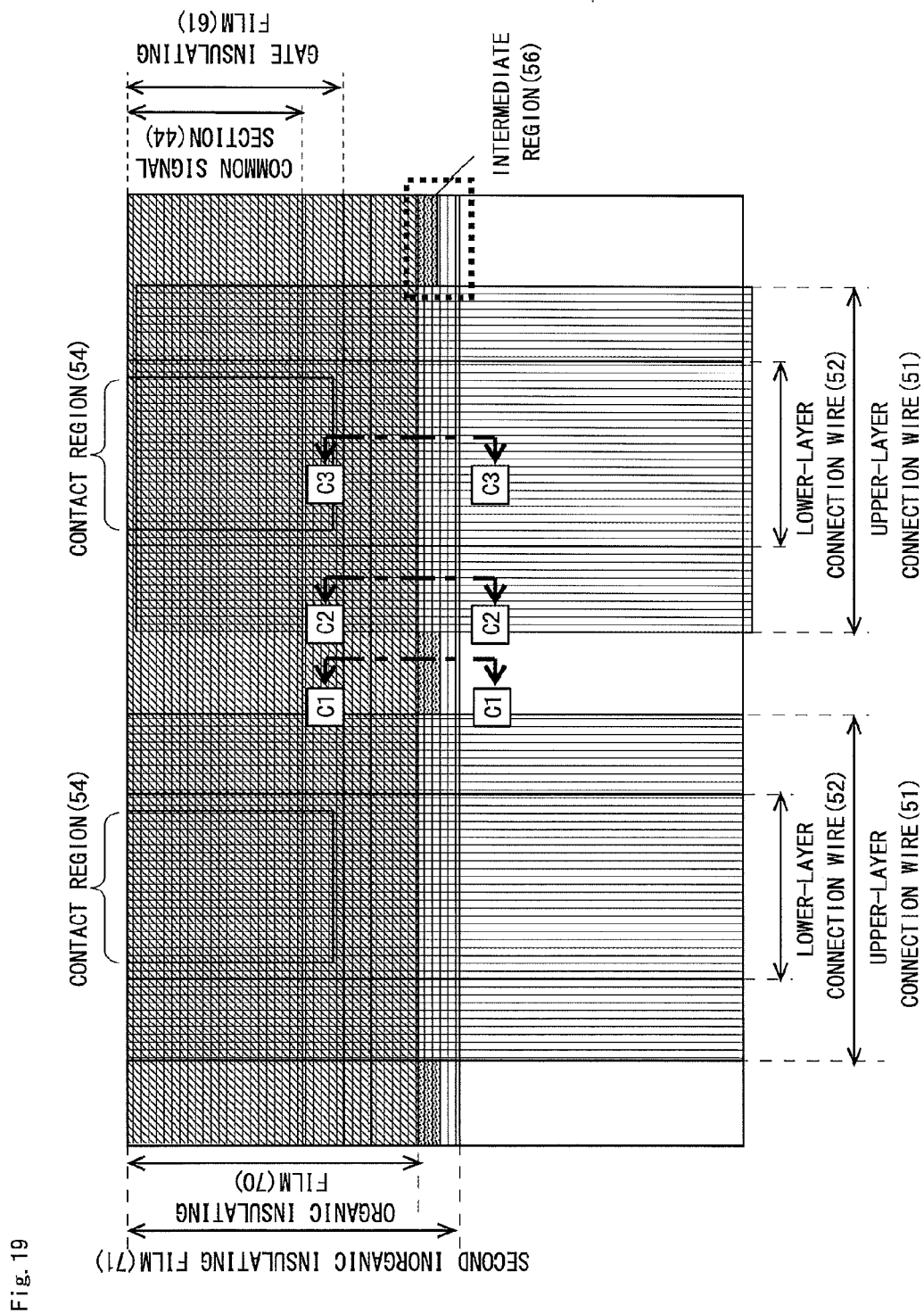
FIG. 19 is a plan view showing a configuration of a connecting wire of a second embodiment.

Configurations of a liquid crystal display device and a cell formed on a mother glass substrate to which a second embodiment of the present invention is applied are the same as the basic configurations of the liquid crystal display device 1 shown in FIG. 1 and the cell 2 shown in FIG. 2. Thus, description thereof will not be repeated. FIG. 19 is a plan view showing a configuration of a connecting wire 50 of the second embodiment. Components in the plan view shown in FIG. 19 that are different from those in the plan view shown in FIG. 4 will be described. As shown in FIG. 19, according to the present embodiment, an intermediate region 56 is formed at a region, of the edge portion of an organic insulating film 70, sandwiched by adjacent upper-layer connecting wires 51. As described above, according to the present embodiment, the intermediate region 56 is provided, instead of the protruding portions 55 formed from the organic insulating film 70, to an inclined surface at the region sandwiched by adjacent connecting wires 50. Details of the intermediate region 56 will be given later. Other components and positional relationship are the same as in the case shown in FIG. 4, and thus description thereof will not be repeated.

Furthermore, as shown in FIG. 19, also in the present embodiment, in order to prevent moisture from entering the inside of the organic insulating film 70, the edge portion of the organic insulating film 70 including the intermediate region 56 is formed more inward than the edge portion of a second inorganic insulating film 71. Accordingly, as the edge portion of the organic insulating film 70 is covered with the edge portion of the second inorganic insulating film 71, no issue on the reliability of the connecting wires 50 will be caused by moisture in the air.

Figure 20:
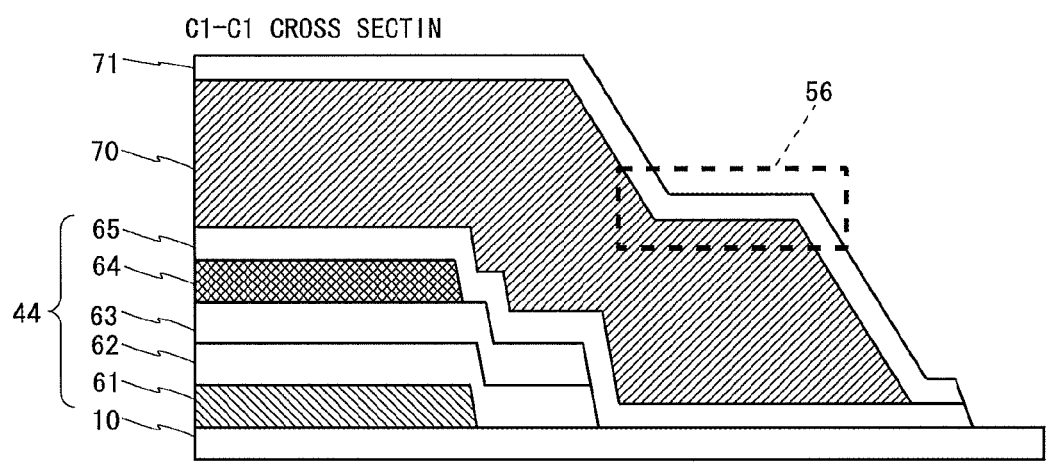
FIG. 20 is a cross-sectional view showing the shape of a cross section of a region between adjacent connecting wires shown in FIG. 19, along arrow C1-C1.

FIG. 20 is a cross-sectional view showing the shape of a cross section of the region between adjacent connecting wires 50 shown in FIG. 19, along arrow C1-C1. As shown in FIG. 20, in the present embodiment, the cross section is the same as that shown in FIG. 5(A) except for the intermediate region 56 provided on the inclined surface of the organic insulating film 70 at the region sandwiched by the adjacent connecting wires 50. Thus, the same components will be denoted by the same reference characters and description thereof will not be repeated. Moreover, because the intermediate region 56 is not formed on the connecting wires 50, the cross sections of the connecting wires 50 at the end portions and the center portions are the same as those shown in FIGS. 5(B) and 5(C), respectively. Accordingly, cross-sectional views of the same are not included herein.

Figure 21:
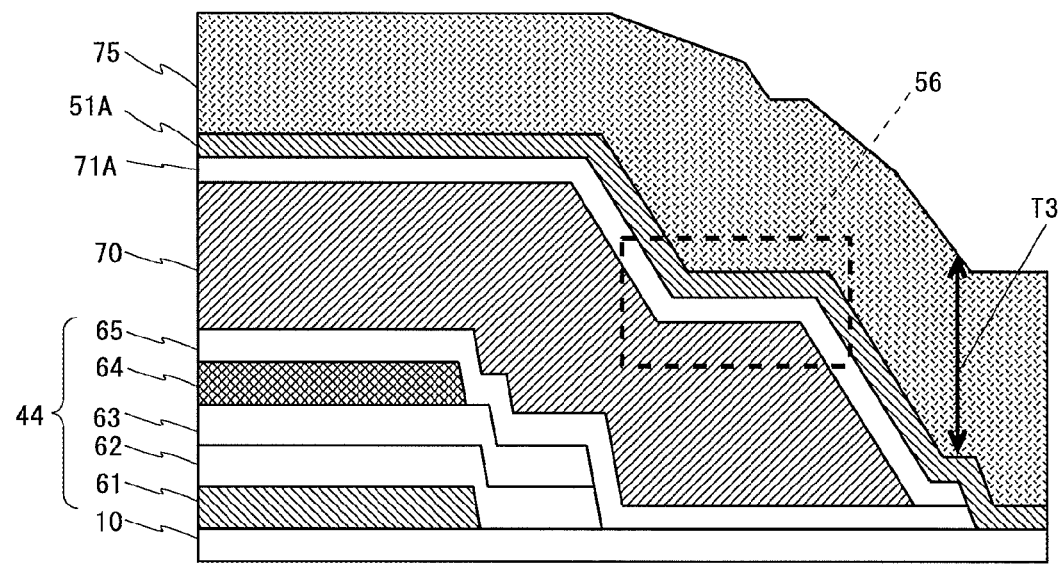
FIG. 21 is a cross-sectional view showing a state where a resist is applied to an organic insulating film which is formed in the second embodiment and which has an intermediate region.

The intermediate region 56 including a step is formed on the inclined surface of the organic insulating film 70 at the region sandwiched by the adjacent connecting wires 50, and a flat surface which is substantially parallel to the surface of the mother glass substrate 10 is formed at the intermediate region 56. FIG. 21 is a cross-sectional view showing a state where a resist is applied to the organic insulating film 70 which has the intermediate region 56. When the ITO film 51A is formed on the organic insulating film 70 via the second inorganic insulating film 71 and the resist 75 is applied thereon to perform patterning of the ITO film 51A, a film thickness T3 of the resist that is formed along the edge line of the organic insulating film 70 is thinner compared to the film thickness T1 shown in FIG. 6(A). This prevents the resist from remaining in a connected manner at the region between the connecting wires 50, and the adjacent connecting wires 50 are prevented from being electrically connected.

Figure 22:
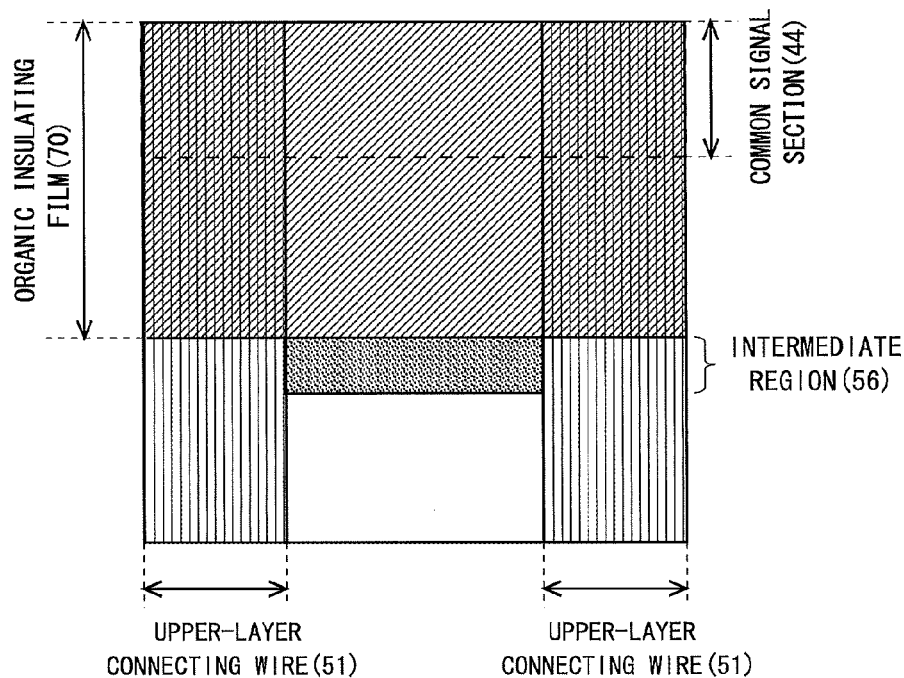
FIGS. 22(A) and 22(B) are plan views showing, in an enlarged manner, the region between the connecting wires shown in FIG. 19.
Figure 22:
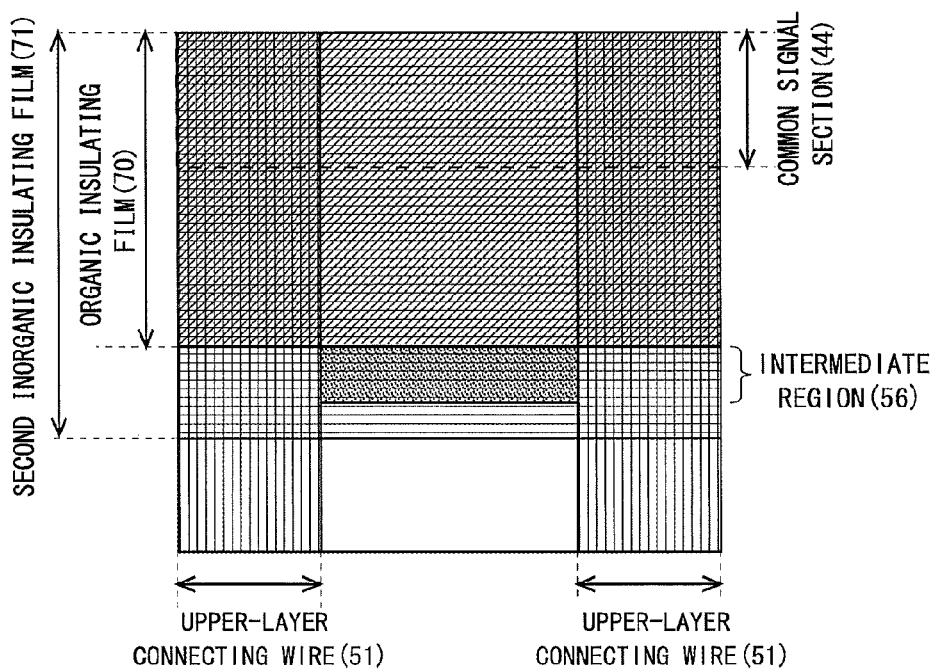

FIGS. 22(A) and 22(B) are plan views showing, in an enlarged manner, the region between the connecting wires 50 shown in FIG. 19, and FIG. 22(A) is a plan view showing the intermediate region 56 formed on the inclined surface of the organic insulating film 70, and FIG. 22(B) is a plan view showing the intermediate region 56 after the second inorganic insulating film 71 is formed. As shown in FIG. 22(A), the intermediate region 56 is formed on the inclined surface of the organic insulating film 70 at the region sandwiched by adjacent connecting wires 50, and is not formed on the connecting wires 50. Next, as shown in FIG. 22(B), the second inorganic insulating film 71 is formed and patterned. The edge portion of the organic insulating film 70 is thereby positioned more inward than the edge portion of the second inorganic insulating film 71, and thus, the edge portion of the organic insulating film 70 is covered with the second inorganic insulating film 71.

Figure 23:
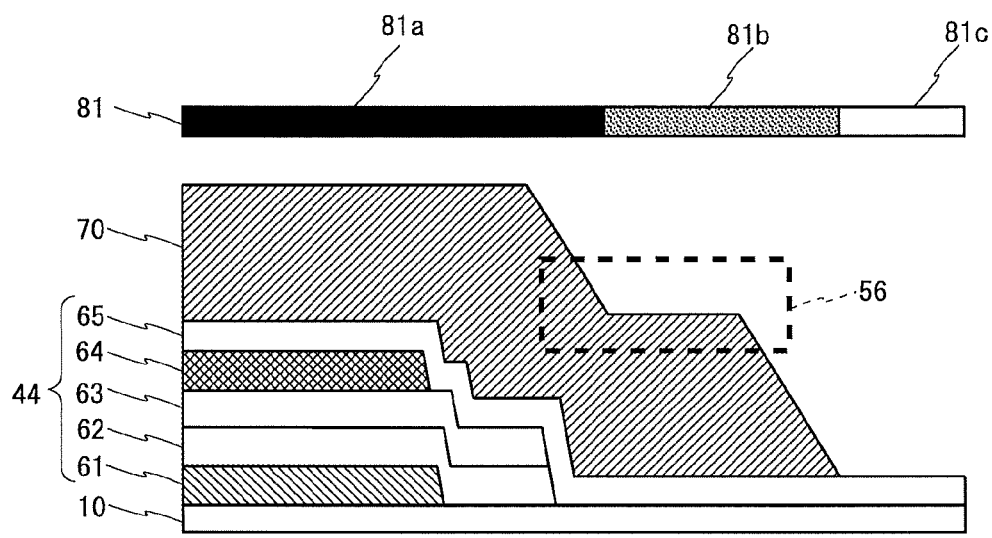
FIG. 23 is a cross-sectional view showing a cross section of an organic insulating film according to the second embodiment after it is patterned using a half-tone mask.

Next, a method for forming a step portion on the inclined surface of the organic insulating film 70 will be described. FIG. 23 is a cross-sectional view showing a cross section of the organic insulating film 70 after it is patterned using a half-tone mask 81 (hereinafter a "mask 81"). In FIG. 23, the configuration of the common signal wire 44 formed below the organic insulating film 70 is the same as the configuration shown in FIG. 5(A), which is the basic configuration. Thus, its components are denoted with the same reference characters and description thereof will not be repeated. The mask 81 that is used at the time of patterning the organic insulating film 70 includes not only a light blocking portion 81a and an opening portion 81c, but also a half-tone portion 81b which is adjusted such that the transmittance of the exposure light is about 30% to 45%, and a pattern corresponding to the intermediate region 56 of the organic insulating film 70 is provided to the half-tone portion 81b. Accordingly, exposure is performed by positioning the mask 81 in such a way that the half-tone portion 81b is at the position where the intermediate region 56 between the connecting wires 50 is to be formed. Therefore, exposure light of energy higher than that for the organic insulating film 70 at the light blocking portion 81a and lower than that for the organic insulating film 70 at the opening portion 81c is irradiated on the organic insulating film 70 at the half-tone portion 81b. Accordingly, a film thickness about half the film thickness at the opening portion 81c is removed from the film thickness of the organic insulating film 70 at the half-tone portion 81b which is removed by development. As a result, the intermediate region 56 having a flat surface is formed on the inclined surface of the organic insulating film 70.

Figure 24:
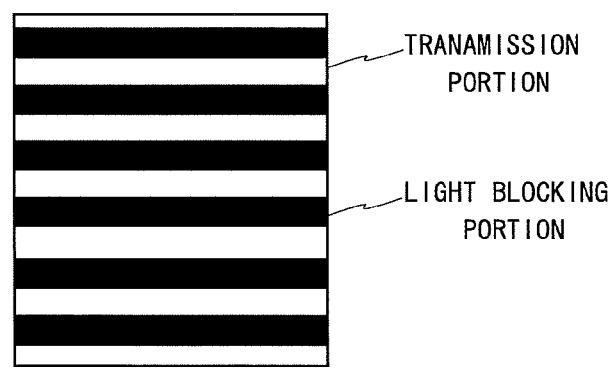
FIG. 24 is a diagram showing an example configuration of a gray tone portion that can be used in the second embodiment.

Note that the transmittance at the half-tone portion 81b is not limited to about 30% to 45% of that at the opening portion 81c, and may be changed as appropriate in the range of about 20% to 80%. Also, a mask including a gray tone portion 81d instead of the half-tone portion 81b may be used to formed the intermediate region 56 at the organic insulating film 70. FIG. 24 is a diagram showings an example configuration of the gray tone portion that can be used in the second embodiment. As shown in FIG. 24, the gray tone portion 81d realizes half-tone by including a transparent fine pattern to a light blocking film so that the amount of transmitted exposure light is reduced. As the fine pattern provided to the gray tone portion 81d, it is possible to use a pattern where lines with a width of 1.5 μm and slits with a width of 1.5 μm are alternately arranged by forming slits to the light blocking film, for example.

As described above, according to the present embodiment, the intermediate region 56 is formed on the inclined surface of the organic insulating film 70 by exposing the organic insulating film 70 of a photosensitive resin by using the mask 81 including the half-tone portion 81b or the gray tone portion 81d at the position corresponding to the inclined surface of the organic insulating film 70 between adjacent connecting wires 50. The inclination of the inclined surface of the organic insulating film 70 sandwiched by the connecting wires 50 is thereby made gradual, and the film thickness of the resist may be prevented from becoming thick along the edge line of the organic insulating film 70 at the time of forming the connecting wires 50. As a result, the resist is prevented from remaining in a connected manner at the region sandwiched by the adjacent connecting wires 50, and leakage between the adjacent connecting wires 50 may be prevented.

3.0 Third Embodiment

Figure 25:
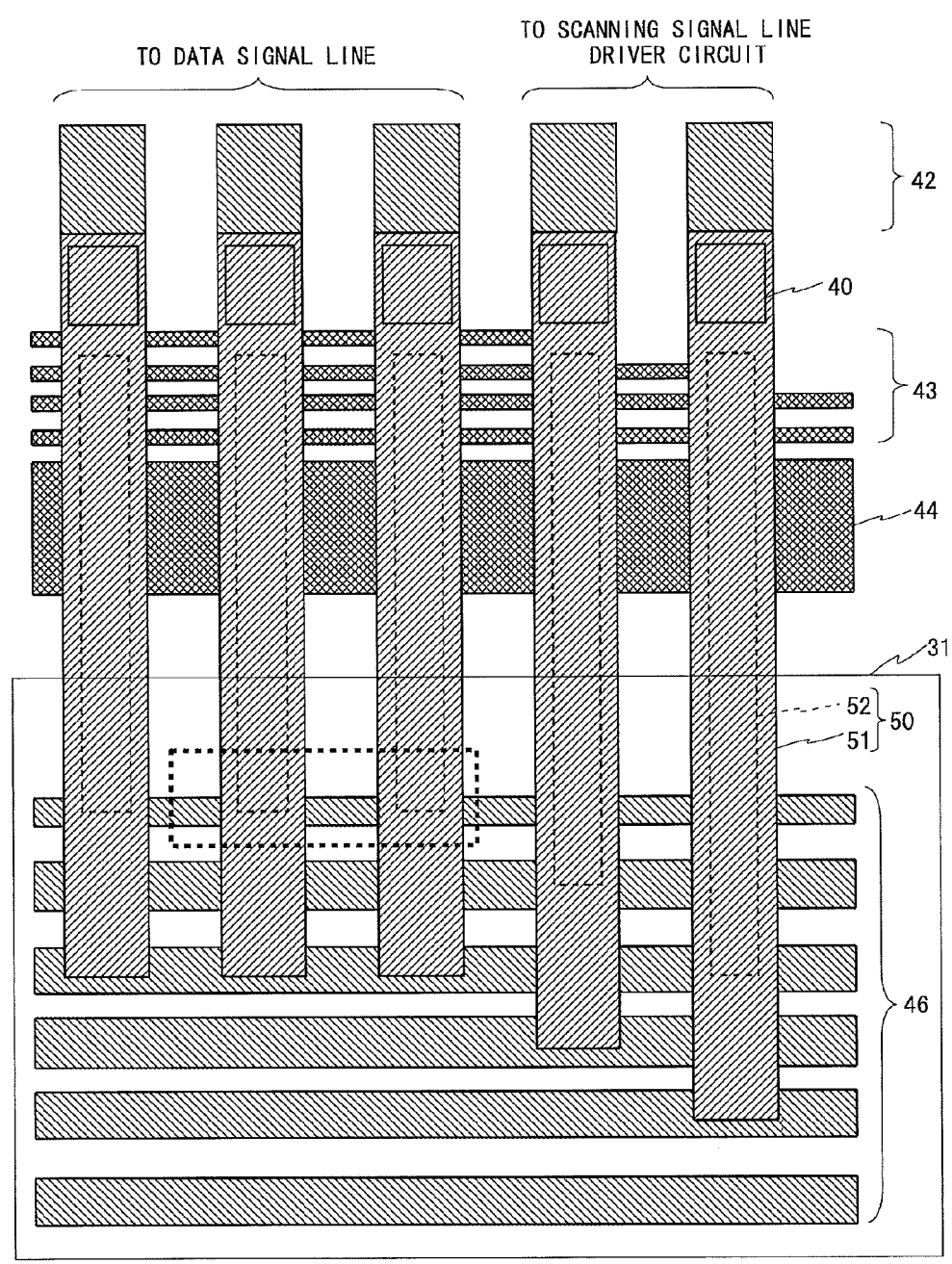
FIG. 25 is a plan view showing an arrangement of connecting wires that are formed on the array substrate of the cell shown in FIG. 2 and are configured to connect testing wires and common testing wires through testing terminals.

Configurations of a liquid crystal display device and a cell formed on a mother glass substrate to which a third embodiment of the present invention is applied are the same as the basic configurations of the liquid crystal display device 1 shown in FIG. 1 and the cell 2 shown in FIG. 2. Thus, description thereof will not be repeated. FIG. 25 is a plan view showing an arrangement of connecting wires 50 that are formed on the array substrate of the cell 2 shown in FIG. 2 and are configured to connect a testing wires 42 and a common testing wires 46 through a testing terminals 40. The pattern arrangement shown in FIG. 25 is the same as the pattern arrangement shown in FIG. 3, and thus description thereof will not be repeated. However, unlike the case shown in FIG. 3, the region surrounded by a dotted line is a region where the common testing wire 46 on a waste substrate region 31 of a mother glass substrate 10 is formed.

Figure 26:
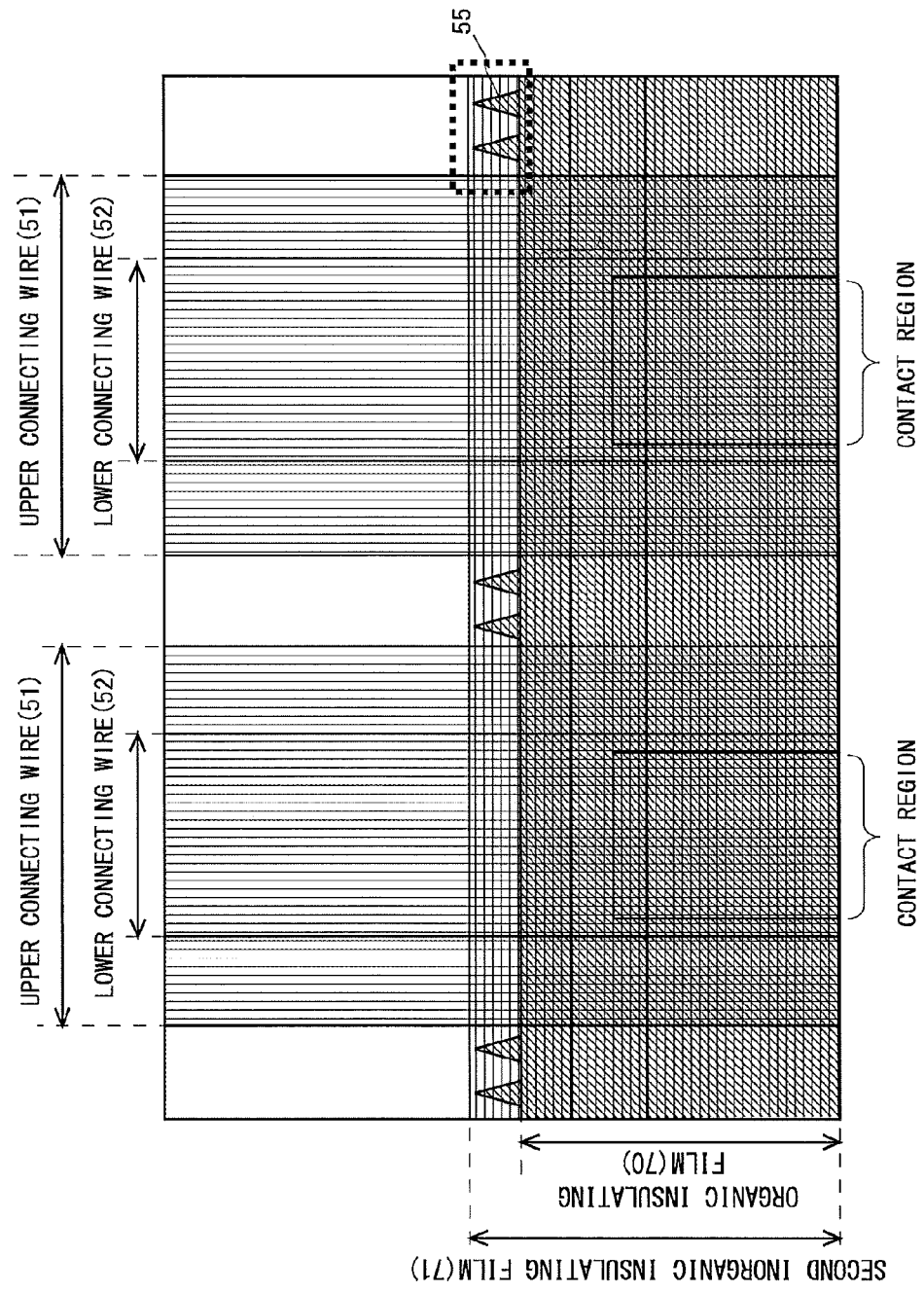
FIG. 26 is a plan view showing a pattern arrangement near connecting wires at a waste substrate region of a mother glass substrate.

In the present embodiment, leakage between the connecting wires 50 occurring due to a resist remaining in a connected manner along an edge line of an organic insulating film 70 near the common testing wire 46 formed on the waste substrate region 31 is prevented. FIG. 26 is a plan view showing a pattern arrangement near the connecting wires 50 at the waste substrate region 31 of the mother glass substrate 10. Each pattern shown in FIG. 26 is a pattern which is vertically reversed from each pattern shown in FIG. 7. Also in this case, protruding portions 55 are formed at the edge portion of the organic insulating film 70 between adjacent connecting wires 50. Also, tip ends of the protruding portions 55 formed from the organic insulating film 70 are positioned more inward than a second inorganic insulating film 71, and thus, the organic insulating film 70 including the protruding portions 55 is covered with the second inorganic insulating film 71.

According to the present embodiment, the protruding portions 55 are formed at the edge of the organic insulating film 70 not only within the cell 2, but also at the waste substrate region 31. Accordingly, the inclination of the inclined surface of the organic insulating film 70 sandwiched by the connecting wires 50 is made gradual also in the waste substrate region 31, and thus, at the time of forming the connecting wires 50, the film thickness of the resist may be prevented from becoming thick along the edge line of the organic insulating film 70. As a result, the resist is prevented from remaining in a connected manner at the region sandwiched by adjacent connecting wires 50, and leakage between the adjacent connecting wires 50 may be prevented.

Additionally, because the common testing wire 46 shown in FIG. 26 is formed only from a gate metal layer, the inclination of the inclined surface of the organic insulating film 70 is more gradual compared to the case of the first embodiment. Accordingly, leakage between the connecting wires 50 due to the resist remaining in a connected manner is less likely to occur, as compared to the case of the first embodiment.

Note that, as in the case of the first embodiment, the shape of the protruding portions 55 is not limited to triangle, and any shape, such as pentagon, is allowed as long as it has a sharp tip end. Also, as in the case of the second embodiment, instead of providing the protruding portions 55, the intermediate region 56 may be formed on the inclined surface of the organic insulating film 70 by using a mask including a half-tone portion or a gray tone portion.

4.0 Others

In many cases, liquid crystal display devices having wide-angle viewing properties adopt a vertical alignment (VA) mode, which allows high productivity. Particularly in the field of mobile devices, a continuous pinwheel alignment (CPA) mode in which liquid crystal molecules are radially aligned with a center portion of a pixel electrode as an alignment center is widely adopted. In the CPA mode, a technology called "Polymer Sustained Alignment Technology" (hereinafter "PSA technology") is adopted in many cases with the aim of improving response characteristics. According to the PSA technology, after fabricating a cell, a photopolymerizable monomer (or oligomer) mixed in advance in a liquid crystal material is polymerized by radiation of ultraviolet rays, in a state where voltage is applied to a liquid crystal layer, to form an alignment sustaining layer ("polymer layer"). By using the alignment sustaining layer, pretilt is given to the liquid crystal molecules. The alignment sustaining layer acts to sustain, also in a state where voltage is not applied, the alignment of the liquid crystal molecules while voltage is applied to the liquid crystal layer Thus, the direction of inclination of the liquid crystal molecules while voltage is not applied matches the direction of inclination of the liquid crystal molecules while voltage is applied. As described above, using the PSA technology, by adjusting the distribution and the intensity of the electric field that is applied at the time of polymerizing monomer, the pretilt direction and the pretilt angle of the liquid crystal molecules may be controlled, and thereby the response characteristics may be improved.

Figure 27:
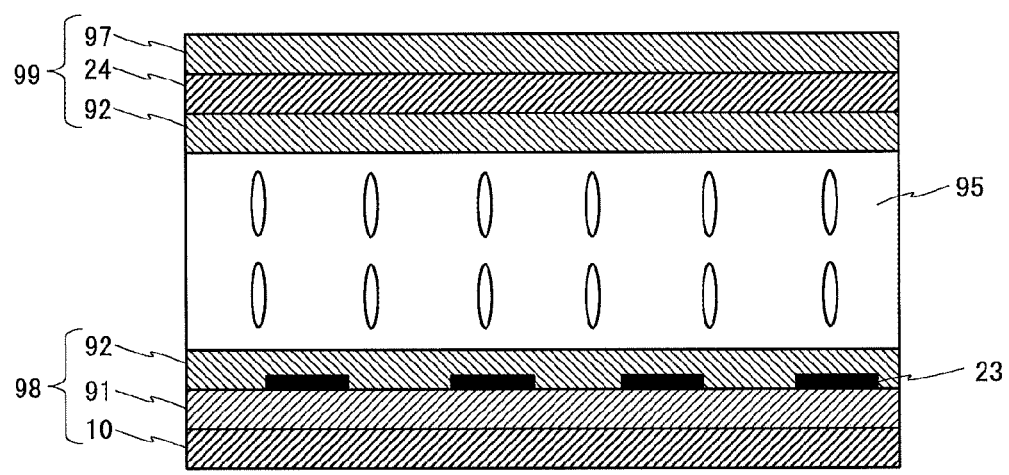
FIGS. 27(A) and 27(B) are cross-sectional views of a CPA mode liquid crystal panel, and more specifically.
Figure 27:
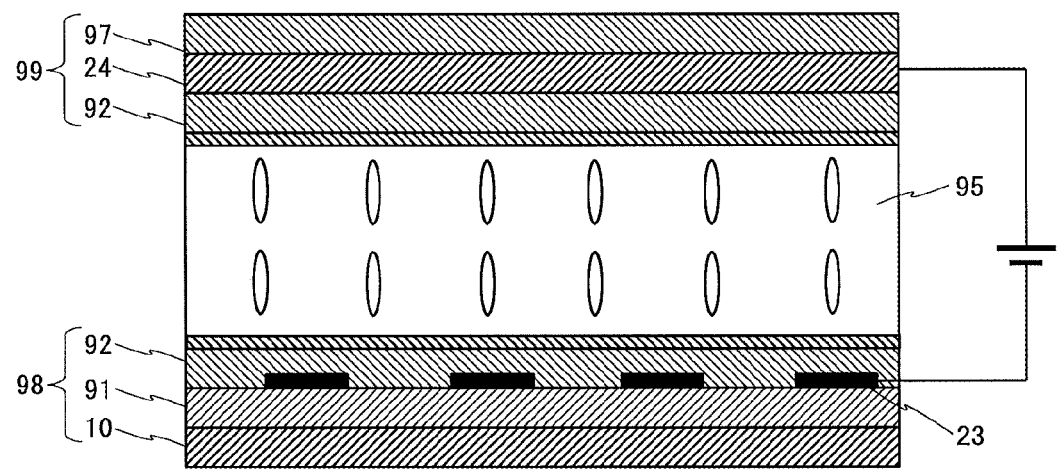

FIGS. 27(A) and 27(B) are cross-sectional views of a CPA mode liquid crystal panel, and more specifically, FIG. 27(A) is a cross-sectional view of the CPA mode liquid crystal panel before photopolymerization, and FIG. 27(B) is a cross-sectional view of the CPA mode liquid crystal panel after photopolymerization. As shown in FIG. 27(A), according to the CPA mode liquid crystal panel, a plurality of pixel electrodes 23 is arranged on an insulating film 91 of an array substrate 98, and a vertical alignment film 92 is formed on their surfaces. A common electrode 24 and a vertical alignment film 92 are formed on a substrate 10 of a counter substrate 99 facing the array substrate 98. A liquid crystal layer 95 in which photopolymerizable monomer is mixed is sandwiched between the array substrate 98 and the counter substrate 99.

Next, as shown in FIG. 27(B), voltage is applied, in this state, between the pixel electrode 23 and the common electrode 24. When ultraviolet rays are radiated in this state, photopolymerizable monomer is polymerized, and alignment sustaining layers 96 are formed on the surfaces of the vertical alignment films 92. As a result, in a state where voltage is not applied, liquid crystal molecules 95a in the liquid crystal layer 95 are aligned by the alignment sustaining layers 96 while being slightly inclined (for example, 2° to 3°) with respect to a direction vertical to the substrate 10. In this manner, the alignment sustaining layers 96 control the alignment direction of the liquid crystal molecules 95a.

At the time of forming such an alignment sustaining layer 96, voltage needs to be applied to the pixel electrode 23. There are the following two methods for this purpose. One is a method for inputting a signal to the pixel electrode 23 through the data signal line 33 from the connecting wire 50 connected to the data signal line 33, and applying voltage to the liquid crystal layer 95 between the pixel electrode 23 and the common electrode 24. Additionally, to write a signal in the pixel electrode 23 from the data signal line 33, a signal for activating the scanning signal line 32 also has to be written at the same time through the connecting wire 50 connected to the scanning signal line 32. According to this method, voltage for forming the alignment sustaining layer 96 may be applied by using the connecting wire 50 described in each of the embodiments above.

Figure 28:
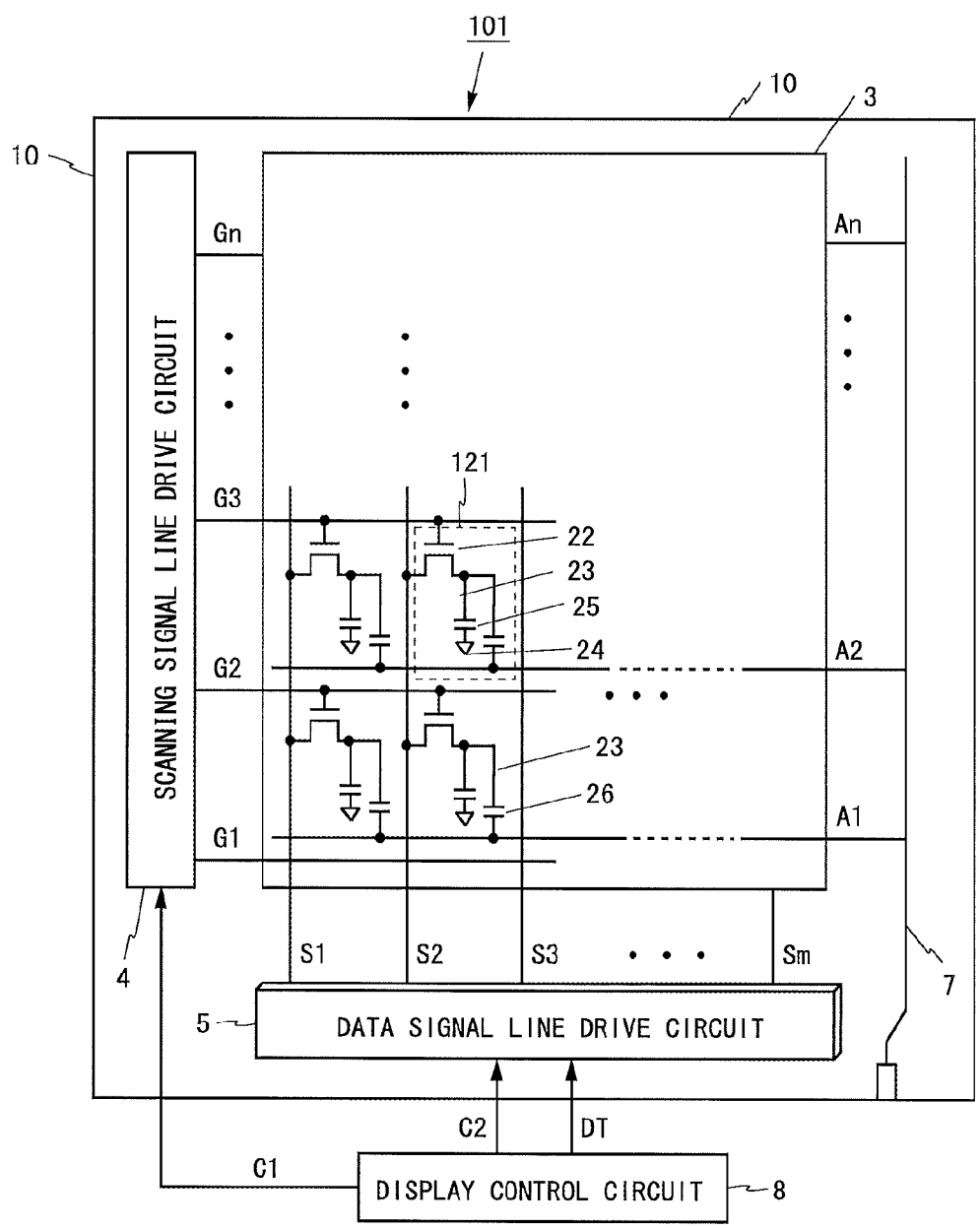
FIG. 28 is a block diagram showing a configuration of a liquid crystal display device including auxiliary capacitance wires.

The other is a method for inputting a signal through an auxiliary capacitance wire of the display portion 3, and applying voltage to the liquid crystal layer 95 between the pixel electrode 23 and the common electrode 24 through parasitic capacitance between the auxiliary capacitance wire and the pixel electrode 23. FIG. 28 is a block diagram showing a configuration of a liquid crystal display device 101 including auxiliary capacitance wires A1 to An. As shown in FIG. 28, except that an auxiliary capacitance trunk wire 7 and n auxiliary capacitance wires A1 to An connected to the auxiliary capacitance trunk wire 7 are added to the liquid crystal display device 1 shown in FIG. 1, other configurations are the same as those of the liquid crystal display device 1. Thus, description thereof will not be repeated. An auxiliary capacitance 26 formed between each of the auxiliary capacitance wires A1 to An and the pixel electrode is further connected to a pixel formation portion 121 shown in FIG. 28, in parallel to the liquid crystal capacitance 25 formed at the pixel formation portion 21 shown in FIG. 1. In this case, a signal for forming the alignment sustaining layer 96 is input to each of the auxiliary capacitance wires A1 to An from the common testing wire 46 through the connecting wire 50 connected to the auxiliary capacitance trunk wire 7. The configuration of the connecting wire 50 connected to each of the auxiliary capacitance wires A1 to An is the same as the connecting wire 50 described in each of the embodiments above, and thus description thereof will not be repeated.

INDUSTRIAL APPLICABILITY

The connecting wire of the present invention is used to input a testing signal for a liquid crystal panel from outside before the liquid crystal panel is cut out from a mother glass substrate.

DESCRIPTION OF REFERENCE CHARACTERS

2: CELL
10: MOTHER GLASS SUBSTRATE (TRANSPARENT SUBSTRATE)

23: PIXEL ELECTRODE
24: COMMON ELECTRODE
31: WASTE SUBSTRATE REGION
40: TESTING TERMINAL
43: TESTING WIRE
44: COMMON SIGNAL WIRE (STEP PORTION)
46: COMMON TESTING WIRE
50: CONNECTING WIRE
51: UPPER-LAYER CONNECTING WIRE
52: LOWER-LAYER CONNECTING WIRE
54: CONTACT REGION
55: PROTRUDING PORTION
56: INTERMEDIATE REGION
70: ORGANIC INSULATING FILM
71: SECOND INORGANIC INSULATING FILM
95: LIQUID CRYSTAL LAYER
96: ALIGNMENT SUSTAINING LAYER

The invention claimed is:

1. A plurality of connecting wires configured to connect, at a transparent substrate where a plurality of cells is formed, wires provided respectively to the plurality of cells and common wires formed at a region of the transparent substrate where the cells are not formed, each cell being a display device configured to display an image in a display portion based on image data supplied from outside after division, wherein
the connecting wire is formed to cross, at the cell, a step portion formed from a conductive layer disposed outside the display portion, a first inorganic insulating film formed on the conductive layer, an organic insulating film formed on the first inorganic insulating film, and a second inorganic insulating film formed on the organic insulating film, and
an inclination of an inclined surface of the organic insulating film at a region sandwiched by the connecting wires that are adjacent to each other is more gradual than inclinations of inclined surfaces at the connecting wires.

2. The connecting wires according to claim 1, wherein at least one protruding portion is formed from the inclined surface of the organic insulating film at the region sandwiched by the adjacent connecting wires toward an edge portion of the second inorganic insulating film, the protruding portion has a shape whose width and thickness are reduced toward a tip end, and the organic insulating film including the protruding portion is covered with the second inorganic insulating film.

3. The connecting wires according to claim 2, wherein the organic insulating film comprises a photosensitive resin, and the protruding portion is formed by performing exposure for a period of time that is longer than a proper period of time by using a mask including a protruding pattern.

4. The connecting wires according to claim 2, wherein the protruding portion or the intermediate region formed at the region sandwiched by the adjacent connecting wires is also formed at a region where the cell is not formed.

5. The connecting wires according to claim 1, wherein each of the connecting wires includes a first connecting wire comprising transparent conductive film.

6. The connecting wires according to claim 5, wherein each of the connecting wires further includes a second connecting wire comprising a transparent conductive film formed between the first connecting wire and the organic insulating film, a width of the second connecting wire is narrower than a width of the first connecting wire, and the first connecting wire and the second connecting wire are electrically connected at a contact region provided to the step portion.

7. The connecting wires according to claim 6, wherein a third connecting wire of a metal having a resistance lower than that of the second connecting wire is formed on one of an upper surface and a lower surface of the second connecting wire, along a length direction of the second connecting wire.

8. The connecting wires according to claim 7, wherein a metal film forming the third connecting wire is one of copper, molybdenum, aluminum, an alloy thereof, and a laminated film of aluminum and molybdenum.

9. The connecting wires according to claim 1, wherein an intermediate region having a flat surface that is substantially parallel to a surface of the transparent substrate is formed on an inclined surface, at a position lower than an upper surface of the step portion, of the organic insulating film at the region sandwiched by the adjacent connecting wires.

10. The connecting wires according to claim 9, wherein the intermediate region is formed by performing exposure and development using a mask including a half-tone portion whose film thickness is adjusted to realize transmittance in a range between that of a light blocking portion configured not to transmit light and that of an opening portion configured to directly transmit light.

11. The connecting wires according to claim 9, wherein the intermediate region is formed by performing exposure and development using a mask including a gray tone portion that is a light blocking film with a plurality of slits.

12. The connecting wires according to claim 1, wherein, to test at least one of disconnection and short-circuit of a scanning signal line or a data signal line formed at the display portion, the connecting wires supply testing signals input from the common wires to testing wires connected to the scanning signal lines and the data signal lines of the plurality of cells formed on the transparent substrate.

13. The connecting wires according to claim 1, wherein the display device is a liquid crystal display device configured to display an image by applying voltage to a liquid crystal layer sandwiched, at the display portion, by a pixel electrode and a common electrode and by controlling light transmittance, and
when polymerizing photopolymerizable monomer or oligomer mixed in advance in the liquid crystal layer and forming an alignment sustaining layer configured to control an alignment direction of liquid crystal molecules included in the liquid crystal layer while voltage is not applied, each of the connecting wires of the plurality of cells formed on the transparent substrate inputs a signal necessary for forming the alignment sustaining layer to the pixel electrode through a data signal line connected to the pixel electrode, and applies voltage to the liquid crystal layer between the pixel electrode and the common electrode.

14. The connecting wires according to claim 13, wherein the liquid crystal display device further includes an auxiliary capacitance wire configured to form auxiliary capacitance with the pixel electrode, and
when polymerizing photopolymerizable monomer or oligomer mixed in advance in the liquid crystal layer and forming the alignment sustaining layer, each of the connecting wires of the plurality of cells formed on the transparent substrate inputs a signal necessary for forming the alignment sustaining layer to the pixel electrode through the auxiliary capacitance wire, and applies voltage to the liquid crystal layer between the pixel electrode and the common electrode.

* * * * *